(12) United States Patent
Belleschi et al.

(10) Patent No.: US 11,528,101 B2
(45) Date of Patent: Dec. 13, 2022

(54) METHODS AND APPARATUS FOR CONTROL INFORMATION TRIGGERING IN WIRELESS NETWORKS

(71) Applicant: Telefonaktiebolaget LM Ericsson (publ), Stockholm (SE)

(72) Inventors: Marco Belleschi, Solna (SE); Mattias Bergström, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 157 days.

(21) Appl. No.: 16/755,185

(22) PCT Filed: Oct. 11, 2018

(86) PCT No.: PCT/SE2018/051042
§ 371 (c)(1),
(2) Date: Apr. 10, 2020

(87) PCT Pub. No.: WO2019/074437
PCT Pub. Date: Apr. 18, 2019

(65) Prior Publication Data
US 2021/0194642 A1    Jun. 24, 2021

Related U.S. Application Data

(60) Provisional application No. 62/571,522, filed on Oct. 12, 2017.

(51) Int. Cl.
*H04L 1/18* (2006.01)
*H04W 28/02* (2009.01)
(Continued)

(52) U.S. Cl.
CPC .......... *H04L 1/1854* (2013.01); *H04L 1/1835* (2013.01); *H04W 28/0242* (2013.01);
(Continued)

(58) Field of Classification Search
None
See application file for complete search history.

(56) References Cited

U.S. PATENT DOCUMENTS

| | | | | |
|---|---|---|---|---|
| 8,681,733 B2* | 3/2014 | Chun | ...................... | H04L 1/189 370/337 |
| 10,433,332 B2* | 10/2019 | Ahn | ...................... | H04W 72/14 |

(Continued)

FOREIGN PATENT DOCUMENTS

| | | |
|---|---|---|
| WO | 2013112703 A2 | 8/2013 |
| WO | 2016120829 A1 | 8/2016 |

(Continued)

OTHER PUBLICATIONS

"RAN2 impacts of LAA sub-frame design options", 3GPP TSG-RAN WG2 Meeting #91 bis, R2-154267, Huawei, HiSilicon, Malmo, Sweden, Oct. 5-9, 2015, 7 pages.

(Continued)

*Primary Examiner* — Mariela Vidal Carpio
(74) *Attorney, Agent, or Firm* — Murphy, Bilak & Homiller, PLLC

(57) ABSTRACT

The disclosure provides methods and apparatus relating to the transmission of control information in uplink access of wireless networks. One embodiment provides a method performed by a wireless device operable in a wireless communications network. The method comprises: responsive to failure of transmission in a first transmission time interval of a first transport block comprising first control information, transmitting in a second, subsequent transmission time interval a second transport block comprising second control information, wherein the second control information is an updated version of the first control information. Failure of transmission of the first transport block comprises the wireless device determining that a wireless (Continued)

channel over which the first transport block is to be transmitted is busy in the first transmission time interval.

6 Claims, 16 Drawing Sheets

(51) Int. Cl.
    *H04W 52/36*     (2009.01)
    *H04W 72/04*     (2009.01)

(52) U.S. Cl.
    CPC ..... *H04W 28/0278* (2013.01); *H04W 52/365* (2013.01); *H04W 72/0413* (2013.01)

(56) References Cited

U.S. PATENT DOCUMENTS

| | | | |
|---|---|---|---|
| 10,849,161 B2* | 11/2020 | Di Girolamo | H04W 16/14 |
| 2013/0039314 A1 | 2/2013 | Prateek et al. | |
| 2014/0177559 A1* | 6/2014 | Hwang | H04W 74/002 |
| | | | 370/329 |
| 2015/0057011 A1* | 2/2015 | Di Girolamo | H04W 72/0446 |
| | | | 455/454 |
| 2015/0289270 A1* | 10/2015 | Knapp | H04W 88/10 |
| | | | 455/452.1 |
| 2016/0143014 A1* | 5/2016 | Mukherjee | H04L 5/0007 |
| | | | 370/330 |
| 2016/0227566 A1* | 8/2016 | Bergström | H04W 74/0808 |
| 2016/0302226 A1* | 10/2016 | Kim | H04W 72/1289 |
| 2016/0330630 A1* | 11/2016 | Yoo | H04L 1/0003 |
| 2017/0118766 A1* | 4/2017 | Baek | H04L 1/1887 |
| 2017/0272199 A1 | 9/2017 | Dinan | |
| 2018/0206212 A1* | 7/2018 | Jiang | H04W 72/1268 |
| 2018/0343666 A1* | 11/2018 | Feng | H04W 72/14 |
| 2019/0082452 A1* | 3/2019 | Zheng | H04W 72/1284 |
| 2019/0090292 A1* | 3/2019 | Tabet | H04W 56/001 |
| 2019/0166627 A1* | 5/2019 | Takeda | H04W 76/27 |
| 2019/0393987 A1* | 12/2019 | Hong | H04L 1/0072 |
| 2020/0008238 A1* | 1/2020 | Huang | H04W 74/08 |
| 2020/0228995 A1* | 7/2020 | Yang | H04W 74/0808 |
| 2020/0259624 A1* | 8/2020 | Heo | H04L 1/001 |
| 2020/0314809 A1* | 10/2020 | Zhang | H04W 72/1268 |

FOREIGN PATENT DOCUMENTS

| | | |
|---|---|---|
| WO | 2016123402 A1 | 8/2016 |
| WO | 2016186004 A1 | 11/2016 |
| WO | 2017049425 A1 | 3/2017 |
| WO | 2017147515 A1 | 8/2017 |
| WO | 2019097301 A1 | 5/2019 |

OTHER PUBLICATIONS

Unknown, Author, "3rd Generation Partnership Project; Technical Specification Group Radio Access Network Evolved Universal Terrestrial Radio Access (E-UTRA); Medium Access Control (MAC) protocol specification (Release 14)", 3GPP TS 36.321 V14.4.0, Sep. 2017, pp. 1-108.

Unknown, Author, "BSR/PHR report for NR-U", 3GPP TSG-RAN WG2 #103-Bis TDoc; R2-1815030; Chengdu, China, Oct. 8-12, 2018, pp. 1-3.

Unknown, Author, "Considerations on Qos control and UL transmission on LAA SCell", 3GPP TSG-RAN WG2 Meeting #93bis; R2-162429; Dubrovnik, Croatia, Apr. 11-15, 2016, pp. 1-5.

* cited by examiner

METHODS AND APPARATUS FOR CONTROL INFORMATION TRIGGERING IN WIRELESS NETWORKS

TECHNICAL FIELD

Embodiments of the disclosure relate to wireless communications, and particularly relate to methods and apparatus for transmitting and triggering the transmission of uplink control information.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The 3GPP work on "Licensed-Assisted Access" (LAA) intends to allow LTE equipment to also operate in the unlicensed radio spectrum. Candidate bands for LTE operation in the unlicensed spectrum include 5 GHz, 3.5 GHz, etc. The unlicensed spectrum can be used as a complement to the licensed spectrum or in standalone operation.

For the case of unlicensed spectrum used as a complement to the licensed spectrum, devices connect in the licensed spectrum (primary cell or PCell) and use carrier aggregation to benefit from additional transmission capacity in the unlicensed spectrum (secondary cell or SCell). The carrier aggregation (CA) framework allows aggregation of two or more carriers with the condition that at least one carrier (or frequency channel) is in the licensed spectrum and at least one carrier is in the unlicensed spectrum. In the standalone (or completely unlicensed spectrum) mode of operation, one or more carriers are selected solely in the unlicensed spectrum.

Regulatory requirements, however, may not permit transmissions in the unlicensed spectrum without prior channel sensing, transmission power limitations or imposed maximum channel occupancy time. Since the unlicensed spectrum must be shared with other radios of similar or dissimilar wireless technologies, a so-called listen-before-talk (LBT) method needs to be applied. LBT involves sensing the medium for a pre-defined minimum amount of time and backing off if the channel is busy. Due to the centralized coordination and dependency of terminal devices on the base-station (eNB) for channel access in LTE operation and imposed LBT regulations, LTE uplink (UL) performance is especially hampered by LBT. UL transmission is becoming more and more important with user-centric applications and the need to push data to cloud.

Today, the unlicensed 5 GHz spectrum is mainly used by equipment implementing the IEEE 802.11 Wireless Local Area Network (WLAN) standard. This standard is known under its marketing brand "Wi-Fi" and allows complete standalone operation in the unlicensed spectrum. Unlike the case in LTE, Wi-Fi terminals can asynchronously access the medium and thus show better UL performance characteristics, especially in congested network conditions.

In LTE the uplink access is typically controlled by the base station (e.g. eNB), i.e., scheduled. In this case the UE would report to the eNB when data is available to be transmitted, e.g., by sending a scheduling request message (SR). Based on this, the eNB would grant the resources and relevant information to the UE in order for the UE to carry out the transmission of a certain size of data. The assigned resources may not necessarily be sufficient for the UE to transmit all the available data. In that case, it is possible that the UE sends a buffer status report (BSR) control message in the granted resources, in order to inform the eNB about the correct size and updated size of the data waiting for transmission. Based on that, the eNB would further grant the resources to carry on with the UE uplink transmission of the correct size of data.

In more detail, every time new data arrives at the UE's empty buffer, the following procedure should be performed:

1. Using Physical Uplink Control Channel (PUCCH), the UE informs the network that it needs to transmit data by sending a Scheduling Request (SR) indicating that it needs uplink access. The UE has periodic timeslots for SR transmissions (typically on a 5, 10, or 20 ms interval).

2. Once the eNB receives the SR request (which may be a single bit), it responds with a small "uplink grant" that is just large enough to communicate the size of the pending buffer. The reaction to this request typically takes 3 ms.

3. After the UE receives and processes (taking about 3 ms) its first uplink grant, it typically sends a Buffer Status Report (BSR) that is a MAC Control Element (MAC CE) used to provide information about the amount of pending data in the uplink buffer of the UE. If the grant is big enough, the UE sends data from its buffer within this transmission as well. Whether the BSR is sent depends also on conditions specified in 3GPP TS 36.321.

4. The eNB receives the BSR message, allocates the necessary uplink resources and sends back another uplink grant that will allow the device to empty its buffer.

In total, about 16 ms (and also time to wait for PUCCH transmission opportunity) of delay can be expected between data arrival at the empty buffer in the UE and reception of this data in the eNB.

Another scheduling option specified in LTE is the so-called semi-persistent scheduling (SPS). One or more SPS configurations can be assigned to a certain UE. Each SPS configuration addresses a set of periodically recurring resources which are to be considered as uplink grant for LTE transmissions. The eNB can activate or deactivate each SPS configuration via DCI on PDCCH. Once the SPS configuration is activated, the UE can use the associated resources. If an SPS configuration is deactivated, the UE should stop using the associated resources.

It should be further noted that in conventional uplink LTE scheduling there is a fixed one-to-one association between TTI and HARQ ID. In this way, the eNB has full control of the status of the different HARQ processes.

Until recently, the spectrum used by LTE has been dedicated to LTE. This has the advantage that the LTE system does not need to care about the coexistence issue and the spectrum efficiency can be maximized. However, the spectrum allocated to LTE is limited and therefore cannot meet the ever-increasing demand for larger throughput from applications/services. Rel-13 LAA extended LTE to exploit unlicensed spectrum in addition to licensed spectrum. Unlicensed spectrum can, by definition, be simultaneously used by multiple different technologies. Therefore, LTE needs to consider the coexistence issue with other systems such as IEEE 802.11 (Wi-Fi). Operating LTE in the same manner in unlicensed spectrum as in licensed spectrum can seriously degrade the performance of Wi-Fi as Wi-Fi will not transmit once it detects the channel is occupied.

Furthermore, one way to utilize the unlicensed spectrum reliably is to transmit essential control signals and channels on a licensed carrier. That is, as shown in FIG. 1, a UE is connected to a PCell in the licensed band and one or more SCells in the unlicensed band. In this application we denote a secondary cell in unlicensed spectrum as licensed-assisted access secondary cell (LAA SCell). In the case of standalone operation, such as in MulteFire, no licensed cell is available for uplink control signal transmissions.

To operate in unlicensed bands one needs to obey certain rules. One such rule is that a transmitter needs to listen on the carrier before one starts to transmit. If the medium is free the transmitter can transmit while if the medium is busy, e.g. some other node is transmitting, the transmitter needs to suppress the transmission and the transmitter can try again at a later time. This is referred to as listen before talk (LBT).

Due to LBT a transmission in an unlicensed band may be delayed until the medium becomes free. If there is no coordination between the transmitting nodes (which is often the case) the delay may appear random.

HARQ Design

Asynchronous HARQ is recommended for LAA UL (e.g., PUSCH). That means UL retransmissions may not only occur one round-trip time (RTT), e.g. n+8, after the initial transmission but rather at any point in time. This is considered beneficial in particular when retransmissions are blocked and postponed due to LBT. When introducing asynchronous HARQ, the UE may therefore assume that all transmitted UL HARQ processes were successful (e.g., set local status to ACK). The UE performs a HARQ retransmission for a HARQ process only upon reception of a corresponding UL Grant (new data indicator (NDI) not toggled) from the eNB.

In downlink, the HARQ process for LAA LTE is as follows. After reception of the PDCCH/EPDCCH and associated PDSCH in subframe 'n', the UE shall have the associated HARQ feedback ready for transmission in subframe 'n+4'. The UE shall transmit any pending HARQ feedback at the earliest possible uplink transmission opportunity following the 'n+4' constraint. The uplink transmission opportunity is defined according to either MF-sPUCCH (MulteFire short PUCCH) or MF-ePUCCH (MF extended PUCCH) resources being available for the UE. When transmitting the HARQ feedback associated to the PDSCH, the UE shall collect pending feedback. The pending HARQ feedback may potentially include feedback for several downlink transmissions. The pending HARQ feedback is collected in a bitmap with an implicit association between the index in the bitmap and the HARQ process ID. The size of this bitmap is configurable by the eNB. The maximum number of HARQ processes for DL operation is 16. When signaled in MF-ePUCCH/sPUCCH bitmap, the default status of a HARQ-ID packet is NACK unless there is an ACK available to be sent.

Asynchronous UL HARQ operation was introduced in LTE Rel-13 for eMTC. There is no support for non-adaptive HARQ operation, and the UE shall ignore any information content on the PHICH resources with respect to HARQ operation. The PHICH resources are maintained as part of the downlink transmission resources, but the information content is reserved for future use. Any uplink transmission (new transmission or retransmission) is scheduled by a UL grant through PDCCH/EPDCCH. However, in this type of asynchronous mechanism there is still a relationship between the HARQ IDs and the TTIs, so that eNB control is still fully possible to some extent. Also, to perform a retransmission the UE has to wait for an explicit UL grant provided by the network. In particular, the eNB may request a retransmission for a certain HARQ process by not toggling the NDI bit for that HARQ process. The eNB may send the PDCCH to trigger a retransmission of an HARQ process at the expiry of the HARQ RTT associated with that HARQ process or (if configured) at any DRX occasion in which the UE is supposed to monitor the DL channel. For example, in Rel.14, the eNB has the possibility to configure a DRX retransmission timer (i.e. drx-ULRetransmissionTimer) which is triggered at expiry of the HARQ RTT. This timer allows the eNB to better counteract possible LBT occurrences which may prevent the eNB from correctly delivering the PDCCH as soon as possible after HARQ RTT expiry.

Unscheduled Uplink for LAA/MulteFire

For LTE UL channel access, both UE and eNB need to perform LBT operations corresponding to the scheduling request, scheduling grant and data transmission phases. In contrast, Wi-Fi terminals only need to perform LBT once in the UL data transmission phase. Moreover, Wi-Fi terminals can asynchronously send data compared to the synchronized LTE system. Thus, Wi-Fi terminals have a natural advantage over LTE terminals in UL data transmission. For example, a UE can start the UL transmission without waiting for permission from the eNB. In other words, a UE can perform LBT to gain UL channel access whenever the UL data arrives without transmitting SR or having an UL grant from the eNB. The UE can use the unscheduled mode for the whole data transmission or alternatively transmit using unscheduled mode for the first N transmission bursts (where N is an integer) and then switch back to the eNB controlled scheduling mode. SPS grants with granted periodicity down to 1 ms may be useful to achieve similar behaviour as autonomous uplink. With periodicity of 1 ms, a UE can attempt to transmit every subframe for the whole granted period.

An additional feature of unscheduled UL for LAA is that the subframe does not necessarily need to be linked to a certain HARQ ID and the UE can autonomously determine which HARQ ID needs to be scheduled and whether the UE should transmit new data or perform retransmissions.

Modelling of LBT in LTE

For LTE unlicensed operation, a model is assumed where the MAC layer generates a MAC PDU or transport block and feeds this to the physical layer. The physical layer may then perform an LBT procedure to determine if the UE is allowed to transmit the transport block. The MAC layer provides the transport block to the physical layer before the LBT procedure and hence is not aware of the outcome of the procedure. That is, the MAC layer will not know in advance whether a MAC PDU/transport block will (successfully) be transmitted by the physical layer or not.

The reason for this is that the procedure of generating a transport block is relatively slow compared to the LBT procedure. When performing LBT the UE should listen to the channel to determine whether it is free or not, and if it is considered free the UE is allowed to transmit. The time from the listening step to the transmission step is generally very short, so that the determination of a free channel is not out of date by the time the transmission starts. On the other hand, the time taken to generate a transport block is much longer, and hence it is not possible for the LBT procedure to be carried out before the generation of a transport block as the LBT procedure would be out of date and (potentially) inaccurate by the time the transport block is ready for transmission.

There currently exist certain challenge(s).

Some control information may need to be promptly delivered by the UE to the eNB, since it may reflect critical UE conditions (e.g. channel conditions, buffer status, power usage etc.) which directly affect the eNB scheduler decisions.

However, due to LBT occurrences, transmission of such control information may need to be postponed and transmitted on a later subframe, thereby affecting the accuracy of such reporting. An inaccurate report may compromise the eNB scheduler and ultimately result in poor resource allocation decisions.

As an example, the buffer status report (BSR) which is sent in the MAC CE should reflect the UE buffer status on the TTI in which the BSR is transmitted. If the BSR transmission has to be postponed due to LBT events, the same BSR will be transmitted as part of the MAC PDU retransmission on a later UL grant when the LBT succeeds, i.e. no new BSR will be generated for the MAC PDU retransmission. The eNB may not know when the BSR was generated since the first transmission failed due to LBT. Therefore, the eNB may provide inaccurate scheduling decisions since the received BSR does not contain up-to-date information.

This problem might be exacerbated in autonomous UL access, since there might be neither time relationship between HARQ IDs and TTIs nor between UL grant reception and HARQ ID transmission, and it is up to UE implementation to determine when to (re)transmit data for a certain HARQ ID. Therefore, when receiving a MAC PDU retransmission including BSR MAC CE associated to a certain HARQ ID, the eNB might not be able to determine when the MAC PDU and its associated MAC CEs were initially generated.

FIG. 2 illustrates this problem, in which listen-before-talk delays the transmission of a MAC control element from a UE to an eNB. That is, in a first transmission time interval during a first set of time slots scheduled to the UE for uplink transmissions, the UE attempts to transmit a message over a shared channel (such as the PUSCH), comprising a MAC control element and—in the Figure—some UL data. However, the transmission fails as the UE determines that the channel on which the transmission is intended to take place is busy. For example, another wireless device may be transmitting using in the same time slots and the same transmission frequency (using the same or a different radio access technology). Thus the first transmission does not take place, and the UE waits until a subsequent grant of UL resources in which to transmit. In a second, subsequent transmission time interval in a second set of time slots scheduled to the UE for uplink transmissions, the UE transmits the same transport block to the eNB (i.e. a retransmission). However, the control information embodied in the MAC control element may now be out of date, and further the eNB is unaware of the time difference between the first time transmission interval (i.e. when the transport block was generated and/or intended to be transmitted) and the second time transmission interval (i.e. when the transport block actually was transmitted). Thus the eNB does not know whether or not the control information is out of date, nor how out-of-date the control information is.

SUMMARY

Certain aspects of the present disclosure and their embodiments may provide solutions to these or other challenges. For example, the present disclosure provides methods and associated apparatus for providing updated control information from a wireless device (e.g. UE) to a network node (e.g. a eNB or gNB), particularly when a previous transmission has failed (e.g. due to LBT occurrences).

In one aspect, there is provided a method performed by a wireless device operable in a wireless communications network. The method comprises: responsive to failure of transmission in a first transmission time interval of a first transport block comprising first control information, transmitting in a second, subsequent transmission time interval a second transport block comprising second control information, wherein the second control information is an updated version of the first control information. Failure of transmission of the first transport block comprises the wireless device determining that a wireless channel over which the first transport block is to be transmitted is busy in the first transmission time interval.

In another aspect, there is provided a method performed by a base station operable in a wireless communications network. The method comprises: receiving, in a first transmission time interval, a first transport block transmitted by a wireless device operable in the wireless communications network; partially decoding the transport block and obtaining a HARQ identity associated with the transport block; transmitting to the wireless device a negative acknowledgement message in respect of the HARQ identity; receiving, in a second, subsequent transmission time interval, a retransmission of the transport block transmitted by the wireless device, the transport block comprising control information; decoding the retransmission of the transport block; and, responsive to a determination that the second transmission time interval is greater than a threshold period of time after the first transmission time interval, transmitting to the wireless device a grant of radio resources for the wireless device to use for uplink transmissions.

There are, proposed herein, various embodiments which address one or more of the issues disclosed herein.

Certain embodiments may provide one or more of the following technical advantage(s). For example, according to one or more of the methods disclosed herein, it is possible for the network to receive updated information on critical control information generated by the UE. This in turn allows the eNB to provide more accurate scheduling decisions to the UE, even if UE transmissions are delayed by LBT, the absence of a time relationship between HARQ IDs and TTI, and/or the absence of a time relationship between UL grant reception and HARQ ID transmission.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Figure 1:
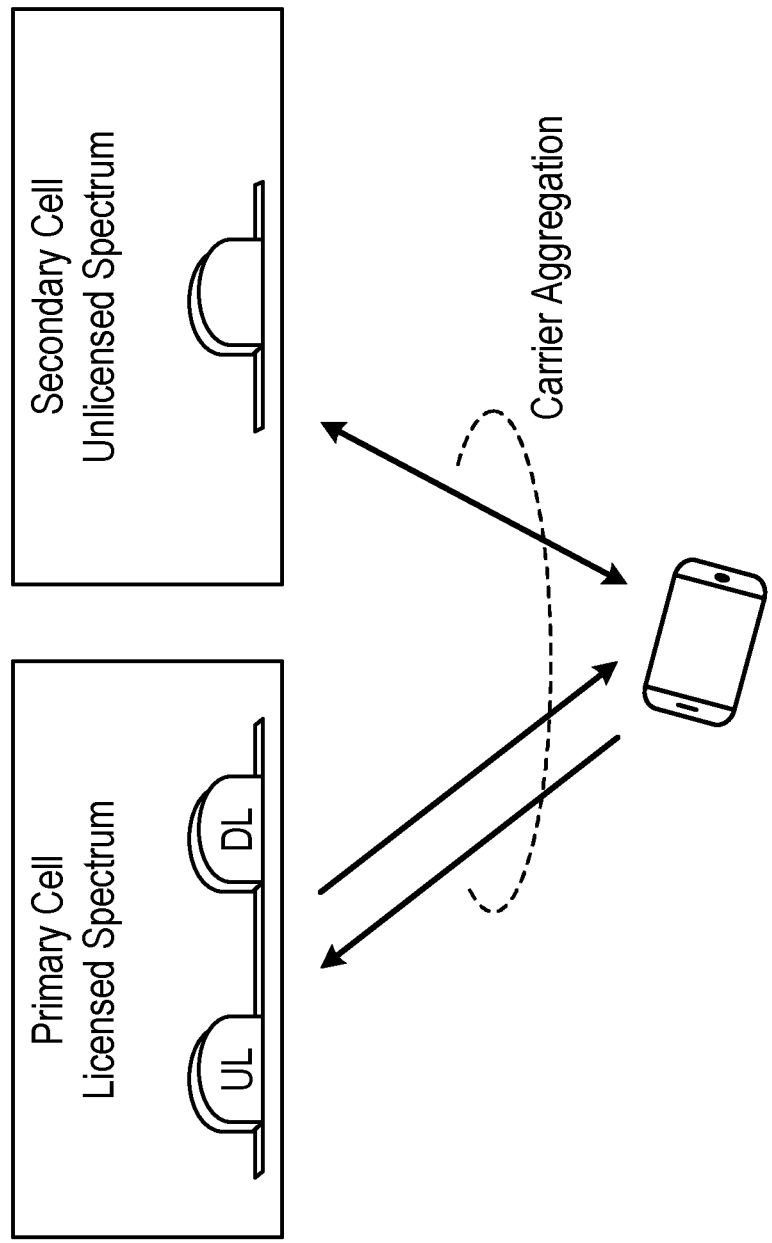
FIG. 1 is a schematic diagram showing licensed-assisted access (LAA) to unlicensed spectrum using carrier aggregation.
Figure 2:
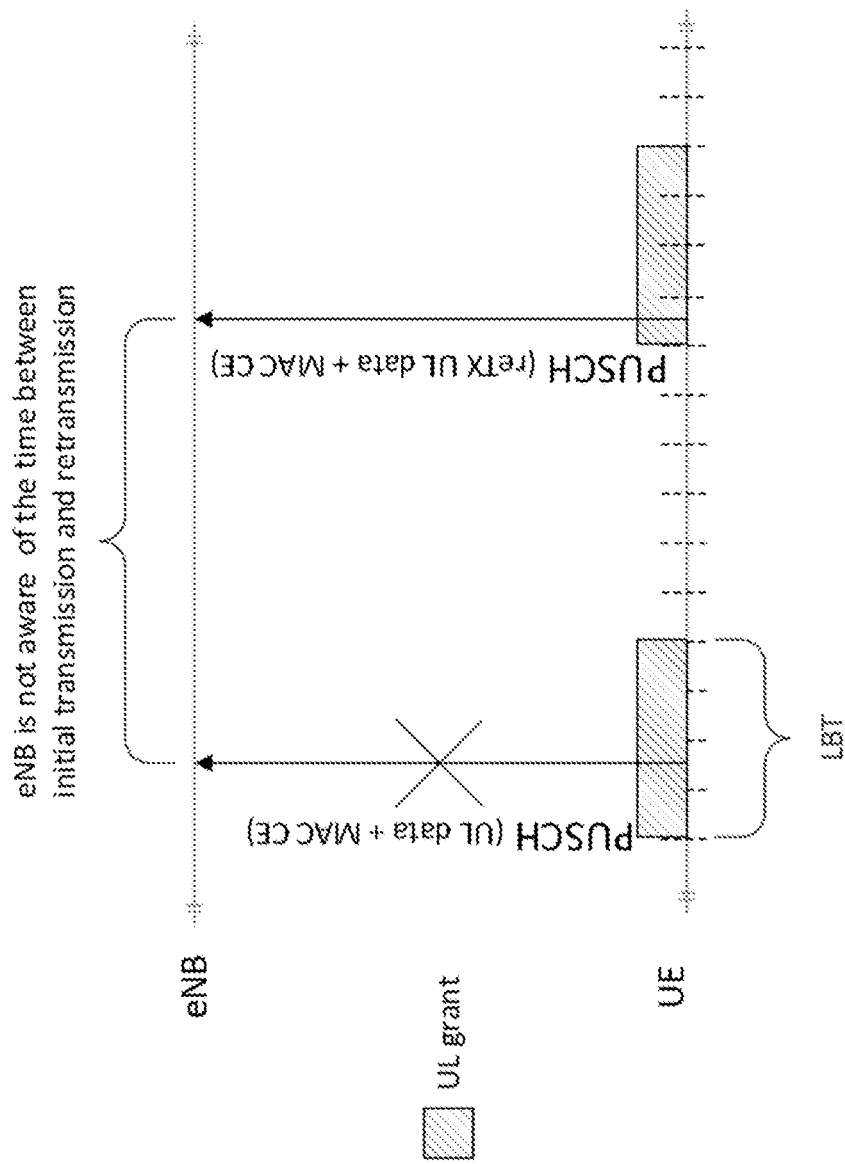
FIG. 2 is a timing diagram showing the problem of listen-before-talk delaying delivery of control information.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

The following embodiments apply to the case in which a transport block (e.g. a MAC protocol data unit (PDU)) containing control information needs to be retransmitted due to one or more events, such as an adverse LBT procedure (i.e. the channel over which the transport block is to be transmitted is found to be busy), a negative acknowledgement message (NACK), or no acknowledgement message, is received from a base station to which the transport block is transmitted, etc.

The control information may comprise a control element (CE), such as a MAC CE. The concepts disclosed herein may be applied to any standardized MAC CE, such as buffer status report (BSR), sidelink BSR (SL-BSR), power headroom report (PHR), semi-persistent scheduling (SPS) confirmation, etc. Alternatively, the control information may comprise or correspond to RRC information that requires timely delivery.

For simplicity in the following we refer to the case of BSR MAC CE, even though the embodiments disclosed hereinafter may apply to any of the aforementioned control information.

One aspect of the disclosure provides methods and associated apparatus in a wireless device or UE, such as the wireless device 510 or the UE 600 described below. According to this aspect of the disclosure, the wireless device is unsuccessful in transmitting a first transport block in a first transmission time interval (TTI). The first transport block comprises first control information, such as any of the various types of control information discussed above. In one embodiment, the generation and transmission of a BSR (e.g. periodic BSR, or regular BSR, or padding BSR) is triggered in the wireless device according to one or more rules (which may be set out in a standard implemented by the wireless device).

Transmission of the first transport block in the first TTI may be unsuccessful for a number of reasons. For example, the wireless device may be configured to implement a listen-before-talk (LBT) procedure prior to transmitting, and transmit only in the event that the channel over which the transmission is intended to take place is sufficiently clear (i.e. no other devices are transmitting using the same transmission frequency(ies) and time slots, or the level of interference from other devices is sufficiently low that a transmission can be expected to be successfully received). If the channel is not sufficiently clear (i.e. the channel is busy), transmission of the first transport block may not be attempted.

Alternatively or additionally, transmission of the first transport block in the first TTI may be unsuccessful due to the first transport block being unsuccessfully received at a receiving device (e.g. a network node, such as the nodes Q160 described below). In that event, the receiving device may transmit a negative acknowledgement message (NACK) to the wireless device identifying a HARQ identity of a HARQ process associated with the first transport block. Alternatively, if no acknowledgement message in respect of the first transport block is received from the receiving device (e.g. within a time window defined for reception of such an acknowledgement message), the wireless device may similarly determine that the first transport block was not successfully received by the receiving device and the transmission of the first transport block may again be determined as unsuccessful.

In a subsequent step, responsive to failure of transmission of the first transport block, the wireless device may build a new transport block (i.e. a second transport block) containing updated, second control information for transmission in a second, subsequent TTI and reflecting the status at the second TTI. The second control information may comprise an updated version of the first control information. Thus, where the first control information comprises a MAC CE (e.g. BSR/PHR content), for example, the second control information may comprise an updated version of the MAC CE with updated information. The updated information may comprise new values, or indications of new values, for one or more control fields recited in the first control information.

Such steps may be implemented in the wireless device in a number of different ways, and the present disclosure is not limited in that respect. One method comprises the steps of cancelling one or more pending MAC CEs (i.e. a MAC CE which is generated but yet to be transmitted), and triggering the generation of one or more new MAC CEs to reflect status (e.g. buffer status, power status, etc.) at the second TTI. In alternative embodiments, it would also be possible to implement the embodiments by other means, i.e. not by cancelling pending MAC CEs and triggering new MAC CEs, but rather by updating the content of the MAC CE information in the pending MAC CEs. Other specific implementations are also possible.

The wireless device may then transmit the second transport block, comprising the second control information, in the second TTI. Of course, those skilled in the art will appreciate that the transmission of the second transport block may also be subject to failure (owing to a negative LBT determination, a NACK message, etc). In that case, the method may be iterated in respect of the second transport block, and a third transport block generated comprising further updated control information, etc.

The method described above may be subject to one or more further considerations.

For example, the second transport block may be generated and/or transmitted based on a comparison of the time difference between the first and second TTIs and a threshold period of time. If the time elapsed between the first and second TTIs is greater than the threshold period of time, the wireless device may generate and/or transmit the second transport block comprising updated control information. Conversely, if the time elapsed between the first and second TTIs is less than the threshold period of time, the wireless device may not generate and/or transmit the second transport block comprising updated control information. In that case, the wireless device may retransmit the first transport block in the second TTI, without generating the second transport block comprising updated control information, or transmit a third transport block comprising the same (i.e. first) control information.

The threshold period of time may vary as a function of the content of the control information to be transmitted. For example, user data may be associated with a particular logical channel and/or logical channel group. A BSR may report the presence and/or amount of such user data in buffers of the wireless device for uplink transmission. In that case, different threshold periods of time may be associated with different logical channels (LCs) or logical channel groups (LCGs). If the BSR to be transmitted contains information for a first LC or LCG (e.g. a LC or LCG associated with a relatively high priority), the time threshold may be relatively shorter than if the BSR to be transmitted contains information for a second LC or LCG (e.g. a LC or LCG associated with a relatively low priority). Thus the network may provide a proper (i.e. accurate) grant of UL resources to satisfy the quality of service (QoS) of the high-priority channels. If the BSR relates to multiple LCs or LCGs, the threshold period of time may be determined based on the LC or LCG having the highest priority.

Figure 3:
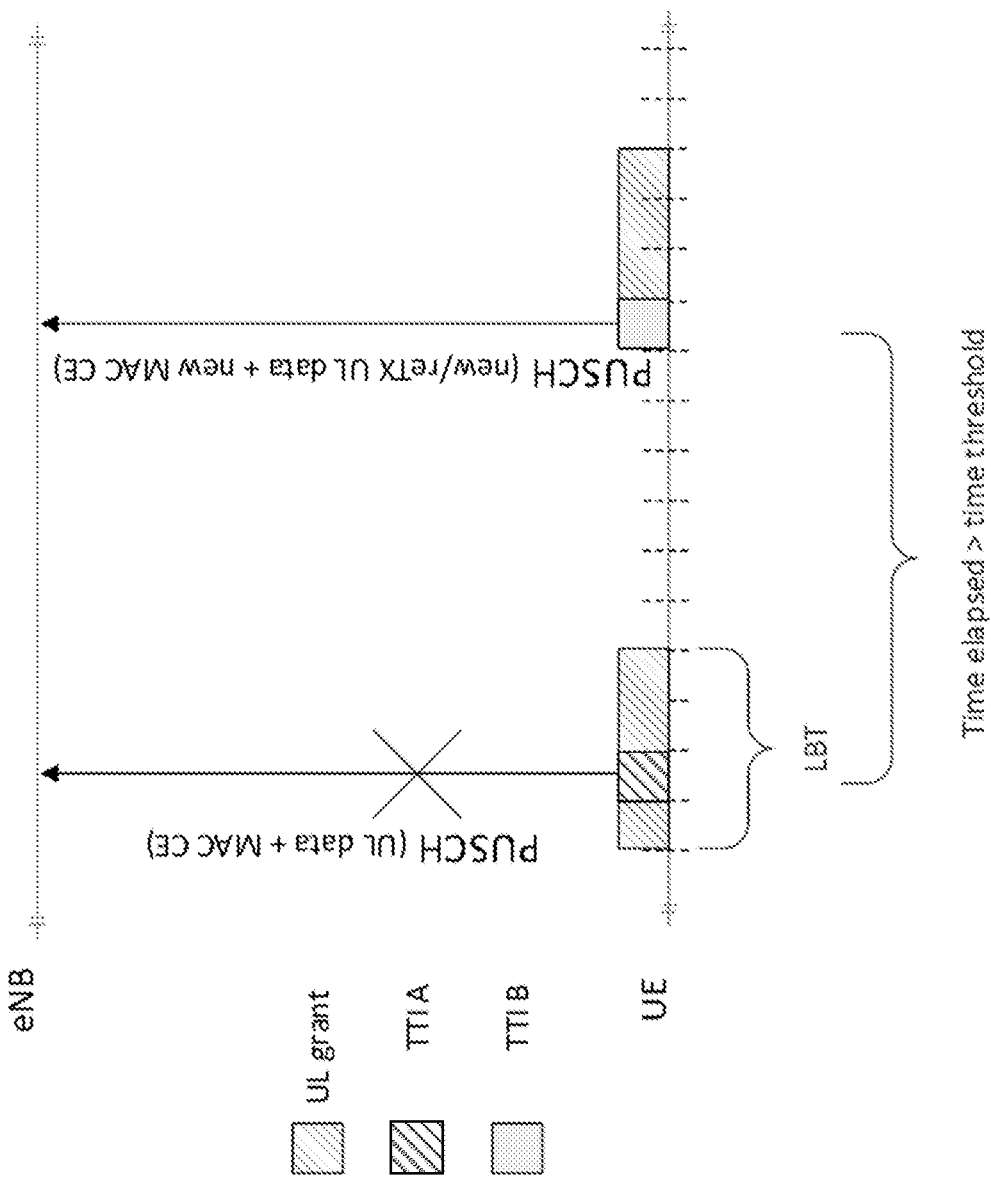
FIG. 3 is a timing diagram showing transmission of uplink control information according to an embodiment of the disclosure.

This method is illustrated in FIG. 3.

Thus the wireless device is granted a first set of radio resources in which to transmit uplink messages to a network node. The first set of radio resources comprises a first transmission time interval (TTI A in the Figure). The wireless device generates a first transport block for transmission to the network node. The first transport block may be intended for transmission over a shared channel, such as the PUSCH. The first transport block comprises first control information (in the illustration, a MAC CE). In the illustration the first transport block additionally comprises UL data (i.e. user data).

The transmission may utilize unlicensed spectrum, and thus the wireless device may perform a listen-before-talk procedure prior to transmission of the first transport block using the TTI A. The wireless device may perform LBT procedures for each of the TTIs specified in the first set of radio resources, or continually listen to the channel during the first set of radio resources, to determine if the channel is available for transmissions.

Transmission of the first transport block is unsuccessful (e.g. due to LBT, NACK, etc), and the wireless device must wait for the next available radio resources scheduled to it before attempting a further transmission. In the illustrated embodiment, the wireless device is scheduled with a second set of radio resources, comprising a second TTI (TTI B in the illustration), at a later time.

The wireless device determines the time difference between the first and second TTI, and compares that time difference to the threshold period of time. In the illustrated embodiment, the time difference is greater than the threshold, and thus the wireless device generates and/or transmits a second transport block comprising second control information, where the second control information comprises an updated version of the first control information (e.g. a new MAC CE comprising new values, or new indications of values for one or more control parameters).

The wireless device may select a TTI for transmission of the second transport block from those TTIs allocated or scheduled to the wireless device for UL transmissions (i.e. the second set of radio resources). For example, in one embodiment the wireless device may determine the second TTI as the next available TTI allocated or scheduled to the wireless device for UL transmissions. Thus the determination of the time difference and the comparison to the threshold may be carried out prior to the second TTI itself.

In further embodiments of the disclosure, the wireless device may determine to generate and/or transmit the second transport block (i.e. comprising updated control information) based on the degree to which that control information changes between the first TTI and the second TTI, or has changed since the first TTI and the point at which the determination is made (which may be before the second TTI).

For example, the wireless device may compare the degree to which the control information has changed to a threshold amount. The threshold amount may be defined as an absolute amount or a relative amount (e.g. a fraction or percentage). The threshold amount may have a defined sign (i.e. positive or negative), or comprise an absolute magnitude. If the control information has changed by more than the threshold amount, the wireless device may generate and/or transmit the second transport block comprising updated control information in the second TTI. If the control information has changed by less than the threshold amount, the wireless device may re-transmit the first transport block in the second TTI, or transmit a third transport block comprising the same (i.e. first) control information.

For example, in the case of a BSR, if new data has arrived in the UE's buffers or data has been transmitted (e.g. to another base station in the case of dual connectivity), the UE may determine the extent to which the amount of data in the buffers has changed (i.e. increased or decreased). If the amount of data in the buffers has changed by less than the threshold amount, the UE may re-transmit the first transport block in the second TTI, or transmit a third transport block comprising the same (i.e. first) control information and the original values for the BSR. If the amount of data in the buffers has changed by more than the threshold amount, the UE may generate and/or transmit a second transport block in the second TTI, comprising second control information, i.e. new values for the BSR. Similarly, in the case of PHR, the UE may transmit updated control information if the change between the power headroom level selected at TTI B and the power headroom level selected at TTI A is larger than a certain threshold.

As with the threshold period of time discussed above, the threshold amounts may vary as a function of the content of the control information to be transmitted. For example, user data may be associated with a particular logical channel and/or logical channel group. A BSR may report the presence and/or amount of such user data in buffers of the wireless device for uplink transmission. In that case, different threshold amounts may be associated with different logical channels (LCs) or logical channel groups (LCGs). If the BSR to be transmitted contains information for a first LC or LCG (e.g. a LC or LCG associated with a relatively high priority), the threshold amount may be relatively less than if the BSR to be transmitted contains information for a second LC or LCG (e.g. a LC or LCG associated with a relatively low priority). Thus the network may provide a proper (i.e. accurate) grant of UL resources to satisfy the quality of service (QoS) of high-priority logical channels. If the BSR relates to multiple LCs or LCGs, the threshold amount may be determined based on the LC or LCG having the highest priority.

Those skilled in the art will appreciate that the threshold amount may be finite, or zero. In the latter case, updated control information is transmitted if the control information changes at all.

The procedures described above, according to which updated control information is generated and transmitted in certain circumstances, may apply only to certain types of control information (e.g. certain MAC CEs) or to any combination of MAC CEs. For those types of control information, a second transport block comprising updated control information may be generated and transmitted under the circumstances outlined above. For other types of control information, the wireless device may be configured not to carry out such an updating procedure. This means that when the transmission is granted at TTI B, the second transport block may contain new information for certain MAC CEs to reflect status at TTI B, while for other MAC CEs the content will be the same as the one at TTI A. In one method, new data may also be included in the second transport block transmission at TTI B, in which case the updated content of the MAC CEs may reflect the buffer status after all transport blocks have been built for this TTI transmission at TTI B.

As described above, it may take some non-negligible time to generate a MAC PDU/transport block. Thus, according to embodiments of the disclosure, generation of the second transport block may be on-going at a point in time at which the channel over which transmission is to take place becomes available (e.g., as determined by a LBT procedure). In order to account for this, the UE may maintain a copy of the first transport block (i.e. with original control information) during generation of the second transport block (i.e. with updated control information). If the LBT procedure indicates that the channel is free and the UE is free to transmit, while the UE is currently in the process of generating the transport block with the up-to-date control information, the UE may apply one of the following two behaviours:

Transmit the first transport block with the non-up-to-date control information—This has the benefit that the UE is not wasting radio resources as the UE will perform the transmission when the channel is free. The UE may stop the generation of the second transport block if this behaviour is applied.

Transmit the second transport block with the up-to-date MAC CE information—This would require the UE to wait until the second transport block has been generated. This may imply that the UE does not transmit anything at all even if the LBT procedure indicates that the channel is free and the UE has data in its buffer. Alternatively the UE may transmit something else in that transmission occasion, e.g. a transport block from another HARQ process, sounding reference signals, etc.

Whether or not the UE applies any of the behaviours described above may depend on whether it is the first transmission of a transport block or not. That is, the UE may follow the methods outlined above and generate a second transport block comprising updated control information if no prior transmission of the transport block (i.e. containing the first control information) has yet been performed by the UE. If the UE has already transmitted the transport block, the methods described herein may not be applied.

In a further embodiment, whether or not the UE applies any of the behaviours described above may depend on which type of radio resource the transport block is intended to be transmitted on. That is, the UE may follow the methods outlined above and generate a second transport block comprising updated control information as a function of the type of radio resource the transport block is intended to be transmitted on. For example, the UE may generate updated control information etc, for transmissions which are intended to be performed on semi-persistent scheduled (SPS) resources, but not for transmissions on resources where the UE receives a specific grant for each transmission (which may be referred to as dynamic scheduling).

The wireless device may be configured to perform the methods outlined above via coding within the wireless device (i.e. the wireless device implementation itself dictates that the methods be performed, etc) or via signalling from a network node (e.g. via dedicated or broadcast signalling). In either case, the wireless device may be configured to apply certain threshold periods of time, or threshold amounts, or to update the control information for certain types of control information, etc.

A further (second) aspect of the disclosure provides methods and associated apparatus in a network node or base station, such as the network nodes 560 described below. According to this aspect of the disclosure, the network node may receive a transport block transmitted by a wireless device in a first TTI, but be able to decode only part of the transport block comprising a HARQ identity (e.g. in uplink control information (UCI)). In particular, the network node may be unable to decode control information (e.g. MAC CEs, including any of those MAC CEs recited above, RRC information, etc) contained within the first transport block. For example, poor channel conditions may dictate that the transport block is only partially received, or transmissions by other wireless devices or network nodes may interfere with the transport block and cause the transport block to be only partly received or decodable. In these circumstances, the network node may transmit HARQ feedback (e.g. a NACK) to the wireless device and await a retransmission of the transport block.

The wireless device may then perform a retransmission (particularly if the HARQ feedback is received within a certain time window of the original transmission of the first transport block), which is successfully received by the network node in a second, subsequent TTI. The retransmission may be identified as a retransmission of the first transport block by use of the same HARQ identity associated with the first transport block.

However, any control information in the transport block may correspond to the original control information in the first, failed transmission (i.e. particularly where the wireless device is not performing the method according to the first aspect described above). Thus control information in the retransmitted transport block may be relatively out-of-date. The network node may then transmit to the wireless device a grant of radio resources for the wireless device to use for uplink transmissions.

According to some embodiments, the grant of radio resources is configured to trigger the transmission of further control information by the wireless device (e.g. a new MAC CE), such that the wireless devices transmits further, updated control information using the granted radio resources. The grant of radio resources may utilize dynamic scheduling (i.e. where radio resources are scheduled for each uplink transmission). The grant of radio resources may be transmitted as soon as possible to the wireless device upon decoding the retransmitted transport block. Further, the granted radio resources may be scheduled as soon as possible to allow the wireless device to transmit further (updated) control information as soon as possible.

In further embodiments, particularly where the control information in the retransmitted transport block comprises a buffer status report, the granted resources comprise an amount of resources required to transmit an amount of data reported in the buffer status report, and an additional amount of resources. Thus the network node grants the wireless devices with additional radio resources, such that the wireless device is granted more than the resources necessary to transmit the data indicated in the buffer status report. The additional amount of radio resources may vary as a function of the amount of time elapsed since between the first and second TTIs. For example, in one embodiment if the amount of time between the first and second TTIs is a first value, the additional resources may be a first amount, while if the amount of time between the first and second TTIs is a second value, less than the first value, the additional resources may be a second amount, less than the first amount. Thus, according to this embodiment, more additional resources are granted to the wireless device if a greater amount of time has elapsed between the original transmission and the subsequent retransmission, to account for the greater uncertainty in the variation of the data available at the wireless device to transmit.

The decision to grant uplink resources to the wireless device may itself depend on the amount of time elapsed between the first and second TTIs. For example, the network node may compare the amount of time to a threshold, and grant uplink resources (prompting a further transmission of control information, or providing additional radio resources according to the embodiments described above) if the amount of time exceeds the threshold. If the amount of time does not exceed the threshold, the network node may grant to the wireless device UL resources sufficient only to transmit the amount of data contained in the BSR, or may not transmit a grant of UL resources at all, or may otherwise follow conventional processing steps.

Figure 4:
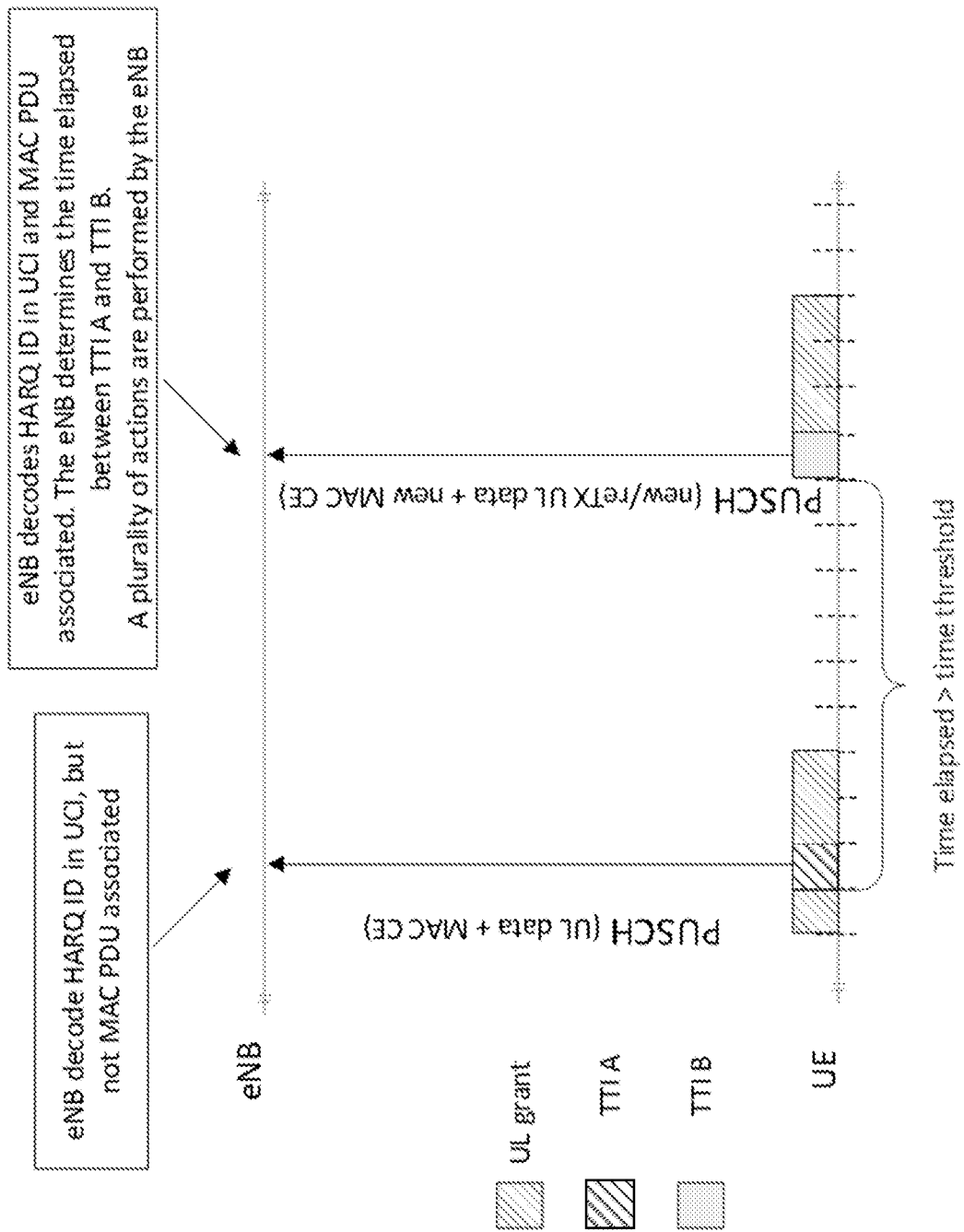
FIG. 4 is a timing diagram showing transmission of uplink control information according to a further embodiment of the disclosure.

A method according to the second aspect is illustrated in FIG. 4.

Figure 5:
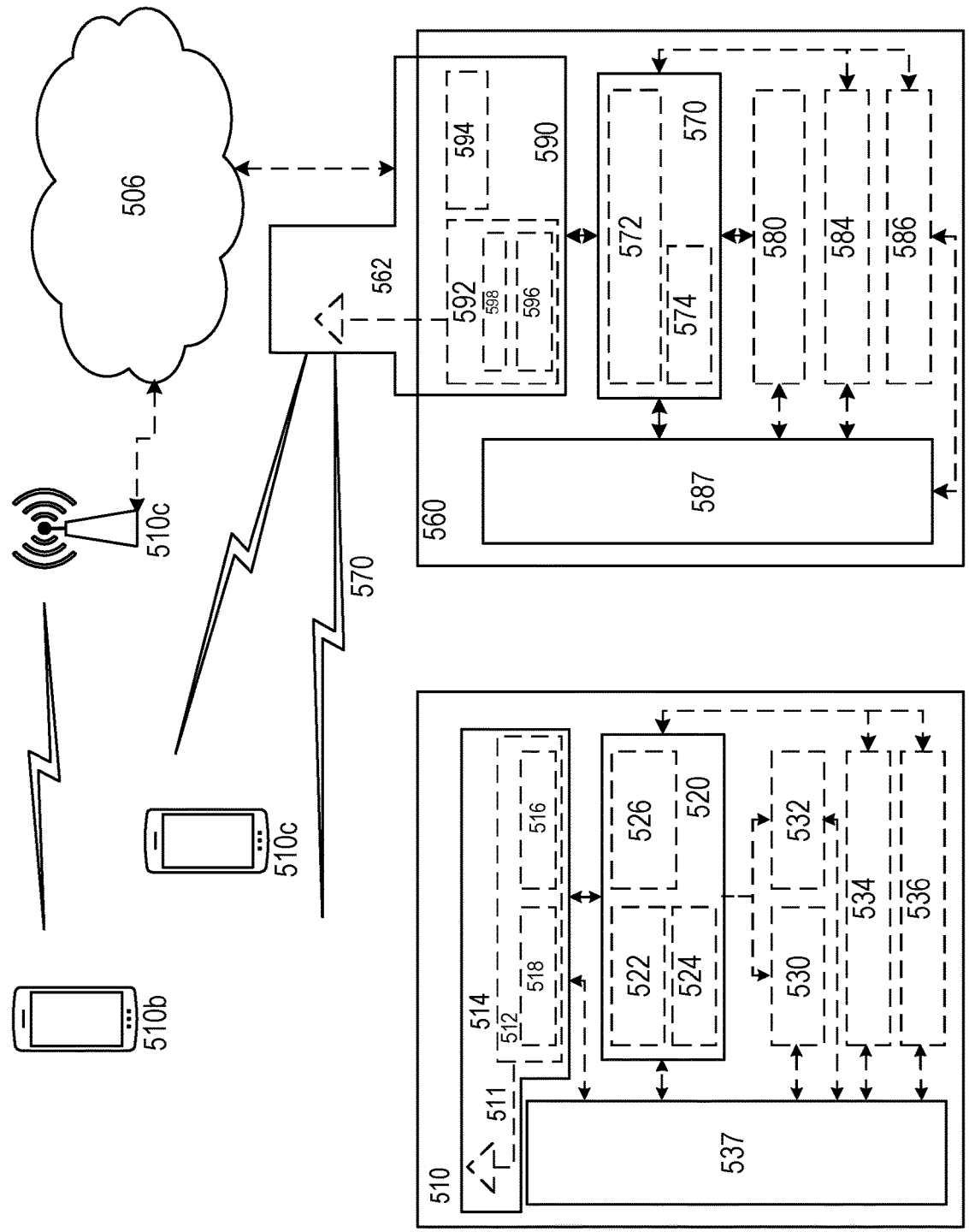
FIG. 5 shows a wireless network according to embodiments of the disclosure.

Although the subject matter described herein may be implemented in any appropriate type of system using any suitable components, the embodiments disclosed herein are described in relation to a wireless network, such as the example wireless network illustrated in FIG. 5. For simplicity, the wireless network of FIG. 5 only depicts network 506, network nodes 560 and 560*b*, and WDs 510, 510*b*, and 510*c*. In practice, a wireless network may further include any additional elements suitable to support communication between wireless devices or between a wireless device and another communication device, such as a landline telephone, a service provider, or any other network node or end device. Of the illustrated components, network node 560 and wireless device (WD) 510 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 506 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 560 and WD 510 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 5, network node 560 includes processing circuitry 570, device readable medium 580, interface 590, auxiliary equipment 584, power source 586, power circuitry 587, and antenna 562. Although network node 560 illustrated in the example wireless network of FIG. 5 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 560 are depicted as single boxes located within a larger box, or nested within multiple boxes, in practice, a network node may comprise multiple different physical components that make up a single illustrated component (e.g., device readable medium 580 may comprise multiple separate hard drives as well as multiple RAM modules).

Similarly, network node 560 may be composed of multiple physically separate components (e.g., a NodeB component and a RNC component, or a BTS component and a BSC component, etc.), which may each have their own respective components. In certain scenarios in which network node 560 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 560 may be configured to support multiple radio access technologies (RATs). In such embodiments, some components may be duplicated (e.g., separate device readable medium 580 for the different RATs) and some components may be reused (e.g., the same antenna 562 may be shared by the RATs). Network node 560 may also include multiple sets of the various illustrated components for different wireless technologies integrated into network node 560, such as, for example, GSM, WCDMA, LTE, NR, WiFi, or Bluetooth wireless technologies. These wireless technologies may be integrated into the same or different chip or set of chips and other components within network node 560.

Processing circuitry 570 is configured to perform any determining, calculating, or similar operations (e.g., certain obtaining operations) described herein as being provided by a network node. These operations performed by processing circuitry 570 may include processing information obtained by processing circuitry 570 by, for example, converting the obtained information into other information, comparing the obtained information or converted information to information stored in the network node, and/or performing one or more operations based on the obtained information or converted information, and as a result of said processing making a determination.

Processing circuitry 570 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 560 components, such as device readable medium 580, network node 560 functionality. For example, processing circuitry 570 may execute instructions stored in device readable medium 580 or in memory within processing circuitry 570. Such functionality may include providing any of the various wireless features, functions, or benefits discussed herein. In some embodiments, processing circuitry 570 may include a system on a chip (SOC).

In some embodiments, processing circuitry 570 may include one or more of radio frequency (RF) transceiver circuitry 572 and baseband processing circuitry 574. In some embodiments, radio frequency (RF) transceiver circuitry 572 and baseband processing circuitry 574 may be on separate chips (or sets of chips), boards, or units, such as radio units and digital units. In alternative embodiments, part or all of RF transceiver circuitry 572 and baseband processing circuitry 574 may be on the same chip or set of chips, boards, or units In certain embodiments, some or all of the functionality described herein as being provided by a network node, base station, eNB or other such network device may be performed by processing circuitry 570 executing instructions stored on device readable medium 580 or memory within processing circuitry 570. In alternative embodiments, some or all of the functionality may be provided by processing circuitry 570 without executing instructions stored on a separate or discrete device readable medium, such as in a hard-wired manner. In any of those embodiments, whether executing instructions stored on a device readable storage medium or not, processing circuitry 570 can be configured to perform the described functionality. The benefits provided by such functionality are not limited to processing circuitry 570 alone or to other components of network node 560, but are enjoyed by network node 560 as a whole, and/or by end users and the wireless network generally.

Device readable medium 580 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 570. Device readable medium 580 may store any suitable instructions, data or information, including a computer program, software, an application including one or more of logic, rules, code, tables, etc. and/or other instructions capable of being executed by processing circuitry 570 and, utilized by network node 560. Device readable medium 580 may be used to store any calculations made by processing circuitry 570 and/or any data received via interface 590. In some embodiments, processing circuitry 570 and device readable medium 580 may be considered to be integrated.

Interface 590 is used in the wired or wireless communication of signalling and/or data between network node 560, network 506, and/or WDs 510. As illustrated, interface 590 comprises port(s)/terminal(s) 594 to send and receive data, for example to and from network 506 over a wired connection. Interface 590 also includes radio front end circuitry 592 that may be coupled to, or in certain embodiments a part of, antenna 562. Radio front end circuitry 592 comprises filters 598 and amplifiers 596. Radio front end circuitry 592 may be connected to antenna 562 and processing circuitry 570.

Radio front end circuitry may be configured to condition signals communicated between antenna 562 and processing circuitry 570. Radio front end circuitry 592 may receive digital data that is to be sent out to other network nodes or WDs via a wireless connection. Radio front end circuitry 592 may convert the digital data into a radio signal having the appropriate channel and bandwidth parameters using a combination of filters 598 and/or amplifiers 596. The radio signal may then be transmitted via antenna 562. Similarly, when receiving data, antenna 562 may collect radio signals which are then converted into digital data by radio front end circuitry 592. The digital data may be passed to processing circuitry 570. In other embodiments, the interface may comprise different components and/or different combinations of components.

In certain alternative embodiments, network node 560 may not include separate radio front end circuitry 592, instead, processing circuitry 570 may comprise radio front end circuitry and may be connected to antenna 562 without separate radio front end circuitry 592. Similarly, in some embodiments, all or some of RF transceiver circuitry 572 may be considered a part of interface 590. In still other embodiments, interface 590 may include one or more ports or terminals 594, radio front end circuitry 592, and RF transceiver circuitry 572, as part of a radio unit (not shown), and interface 590 may communicate with baseband processing circuitry 574, which is part of a digital unit (not shown).

Antenna 562 may include one or more antennas, or antenna arrays, configured to send and/or receive wireless signals. Antenna 562 may be coupled to radio front end circuitry 590 and may be any type of antenna capable of transmitting and receiving data and/or signals wirelessly. In some embodiments, antenna 562 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 562 may be separate from network node 560 and may be connectable to network node 560 through an interface or port.

Antenna 562, interface 590, and/or processing circuitry 570 may be configured to perform any receiving operations and/or certain obtaining operations described herein as being performed by a network node. Any information, data and/or signals may be received from a wireless device, another network node and/or any other network equipment. Similarly, antenna 562, interface 590, and/or processing circuitry 570 may be configured to perform any transmitting operations described herein as being performed by a network node. Any information, data and/or signals may be transmitted to a wireless device, another network node and/or any other network equipment.

Power circuitry 587 may comprise, or be coupled to, power management circuitry and is configured to supply the components of network node 560 with power for performing the functionality described herein. Power circuitry 587 may receive power from power source 586. Power source 586 and/or power circuitry 587 may be configured to provide power to the various components of network node 560 in a form suitable for the respective components (e.g., at a voltage and current level needed for each respective component). Power source 586 may either be included in, or external to, power circuitry 587 and/or network node 560. For example, network node 560 may be connectable to an external power source (e.g., an electricity outlet) via an input circuitry or interface such as an electrical cable, whereby the external power source supplies power to power circuitry 587. As a further example, power source 586 may comprise a source of power in the form of a battery or battery pack which is connected to, or integrated in, power circuitry 587. The battery may provide backup power should the external power source fail. Other types of power sources, such as photovoltaic devices, may also be used.

Alternative embodiments of network node 560 may include additional components beyond those shown in FIG. 5 that may be responsible for providing certain aspects of the network node's functionality, including any of the functionality described herein and/or any functionality necessary to support the subject matter described herein. For example, network node 560 may include user interface equipment to allow input of information into network node 560 and to allow output of information from network node 560. This may allow a user to perform diagnostic, maintenance, repair, and other administrative functions for network node 560.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (Vol P) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 510 includes antenna 511, interface 514, processing circuitry 520, device readable medium 530, user interface equipment 532, auxiliary equipment 534, power source 536 and power circuitry 537. WD 510 may include multiple sets of one or more of the illustrated components for different wireless technologies supported by WD 510, such as, for example, GSM, WCDMA, LTE, NR, WiFi, WiMAX, or Bluetooth wireless technologies, just to mention a few. These wireless technologies may be integrated into the same or different chips or set of chips as other components within WD 510.

Antenna 511 may include one or more antennas or antenna arrays, configured to send and/or receive wireless signals, and is connected to interface 514. In certain alternative embodiments, antenna 511 may be separate from WD 510 and be connectable to WD 510 through an interface or port. Antenna 511, interface 514, and/or processing circuitry 520 may be configured to perform any receiving or transmitting operations described herein as being performed by a WD. Any information, data and/or signals may be received from a network node and/or another WD. In some embodiments, radio front end circuitry and/or antenna 511 may be considered an interface.

As illustrated, interface 514 comprises radio front end circuitry 512 and antenna 511. Radio front end circuitry 512 comprise one or more filters 518 and amplifiers 516. Radio front end circuitry 514 is connected to antenna 511 and processing circuitry 520, and is configured to condition signals communicated between antenna 511 and processing circuitry 520. Radio front end circuitry 512 may be coupled to or a part of antenna 511. In some embodiments, WD 510 may not include separate radio front end circuitry 512; rather, processing circuitry 520 may comprise radio front end circuitry and may be connected to antenna 511. Similarly, in some embodiments, some or all of RF transceiver circuitry 522 may be considered a part of interface 514. Radio front end circuitry 512 may receive digital data that is to be sent out to other network nodes or WDs via a wireless connection. Radio front end circuitry 512 may convert the digital data into a radio signal having the appropriate channel and bandwidth parameters using a combination of filters 518 and/or amplifiers 516. The radio signal may then be transmitted via antenna 511. Similarly, when receiving data, antenna 511 may collect radio signals which are then converted into digital data by radio front end circuitry 512. The digital data may be passed to processing circuitry 520. In other embodiments, the interface may comprise different components and/or different combinations of components.

Processing circuitry 520 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 510 components, such as device readable medium 530, WD 510 functionality. Such functionality may include providing any of the various wireless features or benefits discussed herein. For example, processing circuitry 520 may execute instructions stored in device readable medium 530 or in memory within processing circuitry 520 to provide the functionality disclosed herein.

As illustrated, processing circuitry 520 includes one or more of RF transceiver circuitry 522, baseband processing circuitry 524, and application processing circuitry 526. In other embodiments, the processing circuitry may comprise different components and/or different combinations of components. In certain embodiments processing circuitry 520 of WD 510 may comprise a SOC. In some embodiments, RF transceiver circuitry 522, baseband processing circuitry 524, and application processing circuitry 526 may be on separate chips or sets of chips. In alternative embodiments, part or all of baseband processing circuitry 524 and application processing circuitry 526 may be combined into one chip or set of chips, and RF transceiver circuitry 522 may be on a separate chip or set of chips. In still alternative embodiments, part or all of RF transceiver circuitry 522 and baseband processing circuitry 524 may be on the same chip or set of chips, and application processing circuitry 526 may be on a separate chip or set of chips. In yet other alternative embodiments, part or all of RF transceiver circuitry 522, baseband processing circuitry 524, and application processing circuitry 526 may be combined in the same chip or set of chips. In some embodiments, RF transceiver circuitry 522 may be a part of interface 514. RF transceiver circuitry 522 may condition RF signals for processing circuitry 520.

In certain embodiments, some or all of the functionality described herein as being performed by a WD may be provided by processing circuitry 520 executing instructions stored on device readable medium 530, which in certain embodiments may be a computer-readable storage medium. In alternative embodiments, some or all of the functionality may be provided by processing circuitry 520 without executing instructions stored on a separate or discrete device readable storage medium, such as in a hard-wired manner. In any of those particular embodiments, whether executing instructions stored on a device readable storage medium or not, processing circuitry 520 can be configured to perform the described functionality. The benefits provided by such functionality are not limited to processing circuitry 520 alone or to other components of WD 510, but are enjoyed by WD 510 as a whole, and/or by end users and the wireless network generally.

Processing circuitry 520 may be configured to perform any determining, calculating, or similar operations (e.g., certain obtaining operations) described herein as being performed by a WD. These operations, as performed by processing circuitry 520, may include processing information obtained by processing circuitry 520 by, for example, converting the obtained information into other information, comparing the obtained information or converted information to information stored by WD 510, and/or performing one or more operations based on the obtained information or converted information, and as a result of said processing making a determination.

Device readable medium 530 may be operable to store a computer program, software, an application including one or more of logic, rules, code, tables, etc. and/or other instructions capable of being executed by processing circuitry 520. Device readable medium 530 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 520. In some embodiments, processing circuitry 520 and device readable medium 530 may be considered to be integrated.

User interface equipment 532 may provide components that allow for a human user to interact with WD 510. Such interaction may be of many forms, such as visual, audial, tactile, etc. User interface equipment 532 may be operable to produce output to the user and to allow the user to provide input to WD 510. The type of interaction may vary depending on the type of user interface equipment 532 installed in WD 510. For example, if WD 510 is a smart phone, the interaction may be via a touch screen; if WD 510 is a smart meter, the interaction may be through a screen that provides usage (e.g., the number of gallons used) or a speaker that provides an audible alert (e.g., if smoke is detected). User interface equipment 532 may include input interfaces, devices and circuits, and output interfaces, devices and circuits. User interface equipment 532 is configured to allow input of information into WD 510, and is connected to processing circuitry 520 to allow processing circuitry 520 to process the input information. User interface equipment 532 may include, for example, a microphone, a proximity or other sensor, keys/buttons, a touch display, one or more cameras, a USB port, or other input circuitry. User interface equipment 532 is also configured to allow output of information from WD 510, and to allow processing circuitry 520 to output information from WD 510. User interface equipment 532 may include, for example, a speaker, a display, vibrating circuitry, a USB port, a headphone interface, or other output circuitry. Using one or more input and output interfaces, devices, and circuits, of user interface equipment 532, WD 510 may communicate with end users and/or the wireless network, and allow them to benefit from the functionality described herein.

Auxiliary equipment 534 is operable to provide more specific functionality which may not be generally performed by WDs. This may comprise specialized sensors for doing measurements for various purposes, interfaces for additional types of communication such as wired communications etc. The inclusion and type of components of auxiliary equipment 534 may vary depending on the embodiment and/or scenario.

Power source 536 may, in some embodiments, be in the form of a battery or battery pack. Other types of power sources, such as an external power source (e.g., an electricity outlet), photovoltaic devices or power cells, may also be used. WD 510 may further comprise power circuitry 537 for delivering power from power source 536 to the various parts of WD 510 which need power from power source 536 to carry out any functionality described or indicated herein. Power circuitry 537 may in certain embodiments comprise power management circuitry. Power circuitry 537 may additionally or alternatively be operable to receive power from an external power source; in which case WD 510 may be connectable to the external power source (such as an electricity outlet) via input circuitry or an interface such as an electrical power cable. Power circuitry 537 may also in certain embodiments be operable to deliver power from an external power source to power source 536. This may be, for example, for the charging of power source 536. Power circuitry 537 may perform any formatting, converting, or other modification to the power from power source 536 to make the power suitable for the respective components of WD 510 to which power is supplied.

Figure 6:
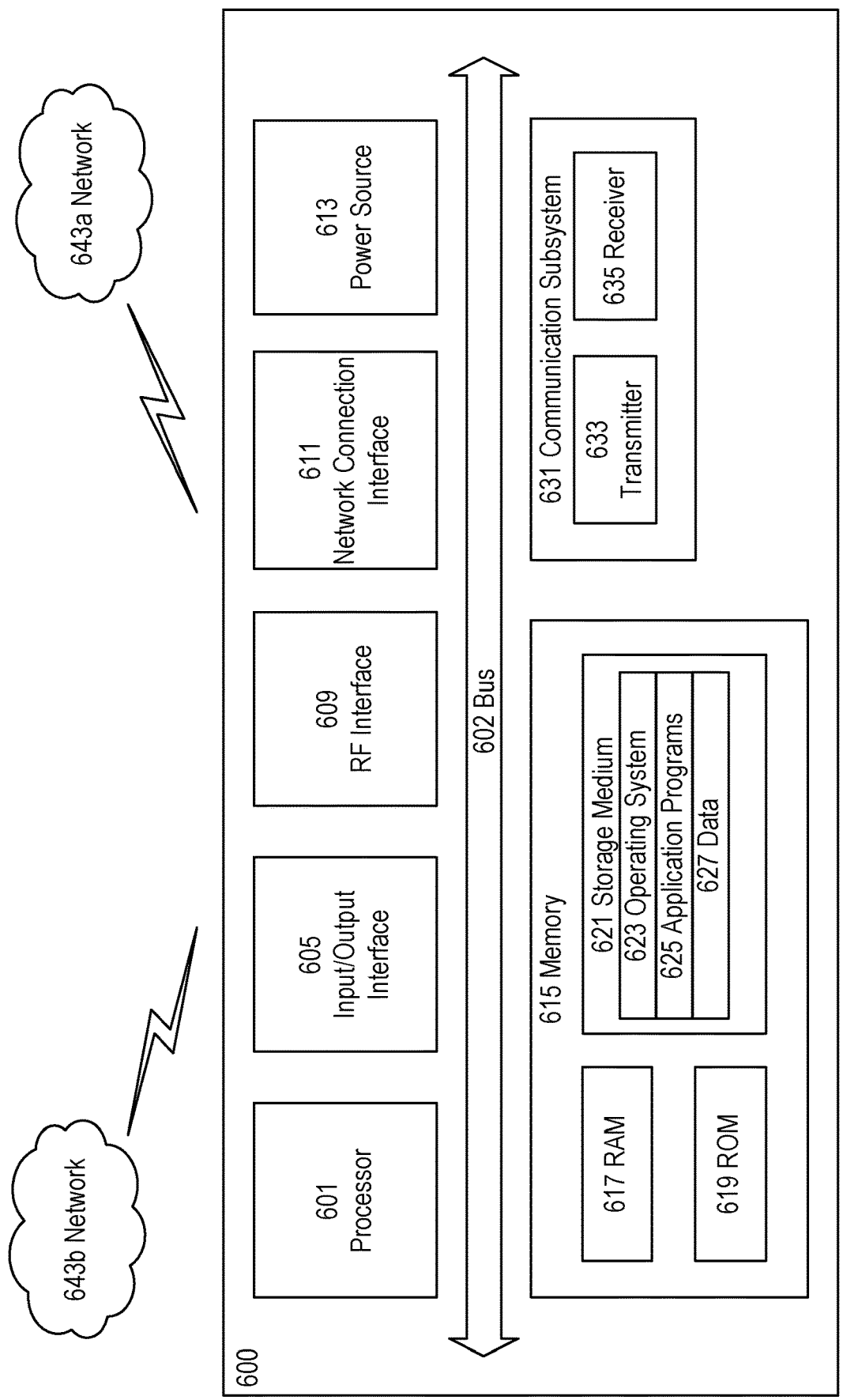
FIG. 6 shows a user equipment according to embodiments of the disclosure.

FIG. 6 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 6200 may be any UE identified by the $3^{rd}$ Generation Partnership Project (3GPP), including a NB-IoT UE, a machine type communication (MTC) UE, and/or an enhanced MTC (eMTC) UE. UE 600, as illustrated in FIG. 6, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 6 is a UE, the components discussed herein are equally applicable to a WD, and vice-versa.

In FIG. 6, UE 600 includes processing circuitry 601 that is operatively coupled to input/output interface 605, radio frequency (RF) interface 609, network connection interface 611, memory 615 including random access memory (RAM) 617, read-only memory (ROM) 619, and storage medium 621 or the like, communication subsystem 631, power source 633, and/or any other component, or any combination thereof. Storage medium 621 includes operating system 623, application program 625, and data 627. In other embodiments, storage medium 621 may include other similar types of information. Certain UEs may utilize all of the components shown in FIG. 6, or only a subset of the components. The level of integration between the components may vary from one UE to another UE. Further, certain UEs may contain multiple instances of a component, such as multiple processors, memories, transceivers, transmitters, receivers, etc.

In FIG. 6, processing circuitry 601 may be configured to process computer instructions and data. Processing circuitry 601 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 601 may include two central processing units (CPUs). Data may be information in a form suitable for use by a computer.

In the depicted embodiment, input/output interface 605 may be configured to provide a communication interface to an input device, output device, or input and output device. UE 600 may be configured to use an output device via input/output interface 605. An output device may use the same type of interface port as an input device. For example, a USB port may be used to provide input to and output from UE 600. The output device may be a speaker, a sound card, a video card, a display, a monitor, a printer, an actuator, an emitter, a smartcard, another output device, or any combination thereof. UE 600 may be configured to use an input device via input/output interface 605 to allow a user to capture information into UE 600. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 6, RF interface 609 may be configured to provide a communication interface to RF components such as a transmitter, a receiver, and an antenna. Network connection interface 611 may be configured to provide a communication interface to network 643a. Network 643a may encompass wired and/or wireless networks such as a local-area network (LAN), a wide-area network (WAN), a computer network, a wireless network, a telecommunications network, another like network or any combination thereof. For example, network 643a may comprise a Wi-Fi network. Network connection interface 611 may be configured to include a receiver and a transmitter interface used to communicate with one or more other devices over a communication network according to one or more communication protocols, such as Ethernet, TCP/IP, SONET, ATM, or the like. Network connection interface 611 may implement receiver and transmitter functionality appropriate to the communication network links (e.g., optical, electrical, and the like). The transmitter and receiver functions may share circuit components, software or firmware, or alternatively may be implemented separately.

RAM 617 may be configured to interface via bus 602 to processing circuitry 601 to provide storage or caching of data or computer instructions during the execution of software programs such as the operating system, application programs, and device drivers. ROM 619 may be configured to provide computer instructions or data to processing circuitry 601. For example, ROM 619 may be configured to store invariant low-level system code or data for basic system functions such as basic input and output (I/O), startup, or reception of keystrokes from a keyboard that are stored in a non-volatile memory. Storage medium 621 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 621 may be configured to include operating system 623, application program 625 such as a web browser application, a widget or gadget engine or another application, and data file 627. Storage medium 621 may store, for use by UE 600, any of a variety of various operating systems or combinations of operating systems.

Storage medium 621 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 621 may allow UE 600 to access computer-executable instructions, application programs or the like, stored on transitory or non-transitory memory media, to off-load data, or to upload data. An article of manufacture, such as one utilizing a communication system may be tangibly embodied in storage medium 621, which may comprise a device readable medium.

In FIG. 6, processing circuitry 601 may be configured to communicate with network 643b using communication subsystem 631. Network 643a and network 643b may be the same network or networks or different network or networks. Communication subsystem 631 may be configured to include one or more transceivers used to communicate with network 643b. For example, communication subsystem 631 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 633 and/or receiver 635 to implement transmitter or receiver functionality, respectively, appropriate to the RAN links (e.g., frequency allocations and the like). Further, transmitter 633 and receiver 635 of each transceiver may share circuit components, software or firmware, or alternatively may be implemented separately.

In the illustrated embodiment, the communication functions of communication subsystem 631 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 631 may include cellular communication, Wi-Fi communication, Bluetooth communication, and GPS communication. Network 643b may encompass wired and/or wireless networks such as a local-area network (LAN), a wide-area network (WAN), a computer network, a wireless network, a telecommunications network, another like network or any combination thereof. For example, network 643b may be a cellular network, a Wi-Fi network, and/or a near-field network. Power source 613 may be configured to provide alternating current (AC) or direct current (DC) power to components of UE 600.

The features, benefits and/or functions described herein may be implemented in one of the components of UE 600 or partitioned across multiple components of UE 600. Further, the features, benefits, and/or functions described herein may be implemented in any combination of hardware, software or firmware. In one example, communication subsystem 631 may be configured to include any of the components described herein. Further, processing circuitry 601 may be configured to communicate with any of such components over bus 602. In another example, any of such components may be represented by program instructions stored in memory that when executed by processing circuitry 601 perform the corresponding functions described herein. In another example, the functionality of any of such components may be partitioned between processing circuitry 601 and communication subsystem 631. In another example, the non-computationally intensive functions of any of such components may be implemented in software or firmware and the computationally intensive functions may be implemented in hardware.

Figure 7:
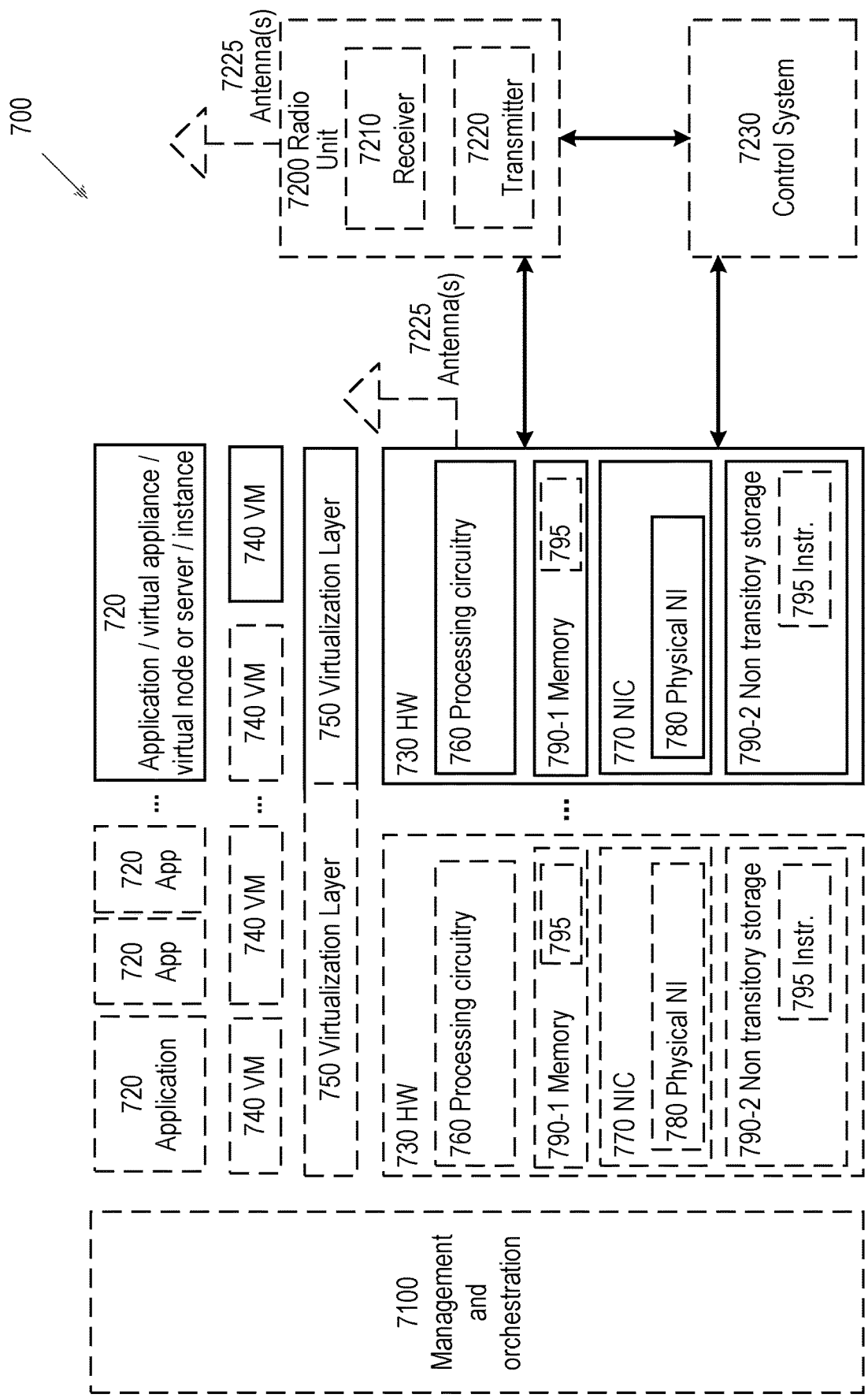
FIG. 7 shows a virtualization environment according to embodiments of the disclosure.

FIG. 7 is a schematic block diagram illustrating a virtualization environment 700 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 700 hosted by one or more of hardware nodes 730. Further, in embodiments in which the virtual node is not a radio access node or does not require radio connectivity (e.g., a core network node), then the network node may be entirely virtualized.

The functions may be implemented by one or more applications 720 (which may alternatively be called software instances, virtual appliances, network functions, virtual nodes, virtual network functions, etc.) operative to implement some of the features, functions, and/or benefits of some of the embodiments disclosed herein. Applications 720 are run in virtualization environment 700 which provides hardware 730 comprising processing circuitry 760 and memory 790. Memory 790 contains instructions 795 executable by processing circuitry 760 whereby application 720 is operative to provide one or more of the features, benefits, and/or functions disclosed herein.

Virtualization environment 700, comprises general-purpose or special-purpose network hardware devices 730 comprising a set of one or more processors or processing circuitry 760, which may be commercial off-the-shelf (COTS) processors, dedicated Application Specific Integrated Circuits (ASICs), or any other type of processing circuitry including digital or analog hardware components or special purpose processors. Each hardware device may comprise memory 790-1 which may be non-persistent memory for temporarily storing instructions 795 or software executed by processing circuitry 760. Each hardware device may comprise one or more network interface controllers (NICs) 770, also known as network interface cards, which include physical network interface 780. Each hardware device may also include non-transitory, persistent, machine-readable storage media 790-2 having stored therein software 795 and/or instructions executable by processing circuitry 760. Software 795 may include any type of software including software for instantiating one or more virtualization layers 750 (also referred to as hypervisors), software to execute virtual machines 740 as well as software allowing it to execute functions, features and/or benefits described in relation with some embodiments described herein.

Virtual machines 740, comprise virtual processing, virtual memory, virtual networking or interface and virtual storage, and may be run by a corresponding virtualization layer 750 or hypervisor. Different embodiments of the instance of virtual appliance 720 may be implemented on one or more of virtual machines 740, and the implementations may be made in different ways.

During operation, processing circuitry 760 executes software 795 to instantiate the hypervisor or virtualization layer 750, which may sometimes be referred to as a virtual machine monitor (VMM). Virtualization layer 750 may present a virtual operating platform that appears like networking hardware to virtual machine 740.

As shown in FIG. 7, hardware 730 may be a standalone network node with generic or specific components. Hardware 730 may comprise antenna 7225 and may implement some functions via virtualization. Alternatively, hardware 730 may be part of a larger cluster of hardware (e.g. such as in a data center or customer premise equipment (CPE)) where many hardware nodes work together and are managed via management and orchestration (MANO) 7100, which, among others, oversees lifecycle management of applications 720.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 740 may be a software implementation of a physical machine that runs programs as if they were executing on a physical, non-virtualized machine. Each of virtual machines 740, and that part of hardware 730 that executes that virtual machine, be it hardware dedicated to that virtual machine and/or hardware shared by that virtual machine with others of the virtual machines 740, forms a separate virtual network elements (VNE).

Still in the context of NFV, Virtual Network Function (VNF) is responsible for handling specific network functions that run in one or more virtual machines 740 on top of hardware networking infrastructure 730 and corresponds to application 720 in FIG. 7.

In some embodiments, one or more radio units 7200 that each include one or more transmitters 7220 and one or more receivers 7210 may be coupled to one or more antennas 7225. Radio units 7200 may communicate directly with hardware nodes 730 via one or more appropriate network interfaces and may be used in combination with the virtual components to provide a virtual node with radio capabilities, such as a radio access node or a base station.

In some embodiments, some signalling can be effected with the use of control system 7230 which may alternatively be used for communication between the hardware nodes 730 and radio units 7200.

Figure 8:
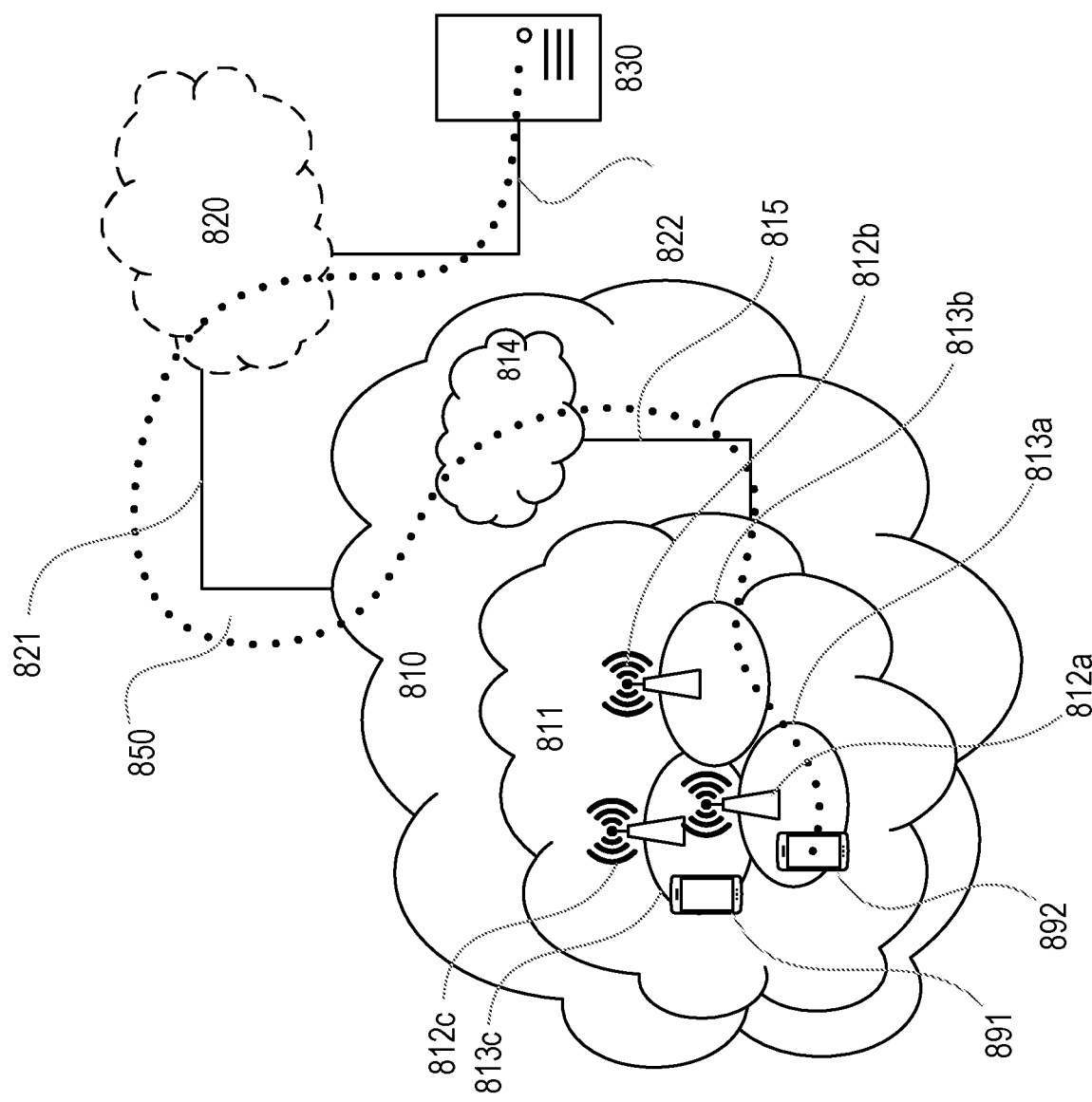
FIG. 8 shows a telecommunication network connected via an intermediate network to a host computer according to embodiments of the disclosure.

With reference to FIG. 8, in accordance with an embodiment, a communication system includes telecommunication network 810, such as a 3GPP-type cellular network, which comprises access network 811, such as a radio access network, and core network 814. Access network 811 comprises a plurality of base stations 812a, 812b, 812c, such as NBs, eNBs, gNBs or other types of wireless access points, each defining a corresponding coverage area 813a, 813b, 813c. Each base station 812a, 812b, 812c is connectable to core network 814 over a wired or wireless connection 815. A first UE 891 located in coverage area 813c is configured to wirelessly connect to, or be paged by, the corresponding base station 812c. A second UE 892 in coverage area 813a is wirelessly connectable to the corresponding base station 812a. While a plurality of UEs 891, 892 are illustrated in this example, the disclosed embodiments are equally applicable to a situation where a sole UE is in the coverage area or where a sole UE is connecting to the corresponding base station 812.

Telecommunication network 810 is itself connected to host computer 830, which may be embodied in the hardware and/or software of a standalone server, a cloud-implemented server, a distributed server or as processing resources in a server farm. Host computer 830 may be under the ownership or control of a service provider, or may be operated by the service provider or on behalf of the service provider. Connections 821 and 822 between telecommunication network 810 and host computer 830 may extend directly from core network 814 to host computer 830 or may go via an optional intermediate network 820. Intermediate network 820 may be one of, or a combination of more than one of, a public, private or hosted network; intermediate network 820, if any, may be a backbone network or the Internet; in particular, intermediate network 820 may comprise two or more subnetworks (not shown).

The communication system of FIG. 8 as a whole enables connectivity between the connected UEs 891, 892 and host computer 830. The connectivity may be described as an over-the-top (OTT) connection 850. Host computer 830 and the connected UEs 891, 892 are configured to communicate data and/or signaling via OTT connection 850, using access network 811, core network 814, any intermediate network 820 and possible further infrastructure (not shown) as intermediaries. OTT connection 850 may be transparent in the sense that the participating communication devices through which OTT connection 850 passes are unaware of routing of uplink and downlink communications. For example, base station 812 may not or need not be informed about the past routing of an incoming downlink communication with data originating from host computer 830 to be forwarded (e.g., handed over) to a connected UE 891. Similarly, base station 812 need not be aware of the future routing of an outgoing uplink communication originating from the UE 891 towards the host computer 830.

Example implementations, in accordance with an embodiment, of the UE, base station and host computer discussed in the preceding paragraphs will now be described with reference to FIG. 9. In communication system 900, host computer 910 comprises hardware 915 including communication interface 916 configured to set up and maintain a wired or wireless connection with an interface of a different communication device of communication system 900. Host computer 910 further comprises processing circuitry 918, which may have storage and/or processing capabilities. In particular, processing circuitry 918 may comprise one or more programmable processors, application-specific integrated circuits, field programmable gate arrays or combinations of these (not shown) adapted to execute instructions. Host computer 910 further comprises software 911, which is stored in or accessible by host computer 910 and executable by processing circuitry 918. Software 911 includes host application 912. Host application 912 may be operable to provide a service to a remote user, such as UE 930 connecting via OTT connection 950 terminating at UE 930 and host computer 910. In providing the service to the remote user, host application 912 may provide user data which is transmitted using OTT connection 950.

Communication system 900 further includes base station 920 provided in a telecommunication system and comprising hardware 925 enabling it to communicate with host computer 910 and with UE 930. Hardware 925 may include communication interface 926 for setting up and maintaining a wired or wireless connection with an interface of a different communication device of communication system 900, as well as radio interface 927 for setting up and maintaining at least wireless connection 970 with UE 930 located in a coverage area (not shown in FIG. 9) served by base station 920. Communication interface 926 may be configured to facilitate connection 960 to host computer 910. Connection 960 may be direct or it may pass through a core network (not shown in FIG. 9) of the telecommunication system and/or through one or more intermediate networks outside the telecommunication system. In the embodiment shown, hardware 925 of base station 920 further includes processing circuitry 928, which may comprise one or more programmable processors, application-specific integrated circuits, field programmable gate arrays or combinations of these (not shown) adapted to execute instructions. Base station 920 further has software 921 stored internally or accessible via an external connection.

Communication system 900 further includes UE 930 already referred to. Its hardware 935 may include radio interface 937 configured to set up and maintain wireless connection 970 with a base station serving a coverage area in which UE 930 is currently located. Hardware 935 of UE 930 further includes processing circuitry 938, which may comprise one or more programmable processors, application-specific integrated circuits, field programmable gate arrays or combinations of these (not shown) adapted to execute instructions. UE 930 further comprises software 931, which is stored in or accessible by UE 930 and executable by processing circuitry 938. Software 931 includes client application 932. Client application 932 may be operable to provide a service to a human or non-human user via UE 930, with the support of host computer 910. In host computer 910, an executing host application 912 may communicate with the executing client application 932 via OTT connection 950 terminating at UE 930 and host computer 910. In providing the service to the user, client application 932 may receive request data from host application 912 and provide user data in response to the request data. OTT connection 950 may transfer both the request data and the user data. Client application 932 may interact with the user to generate the user data that it provides.

Figure 9:
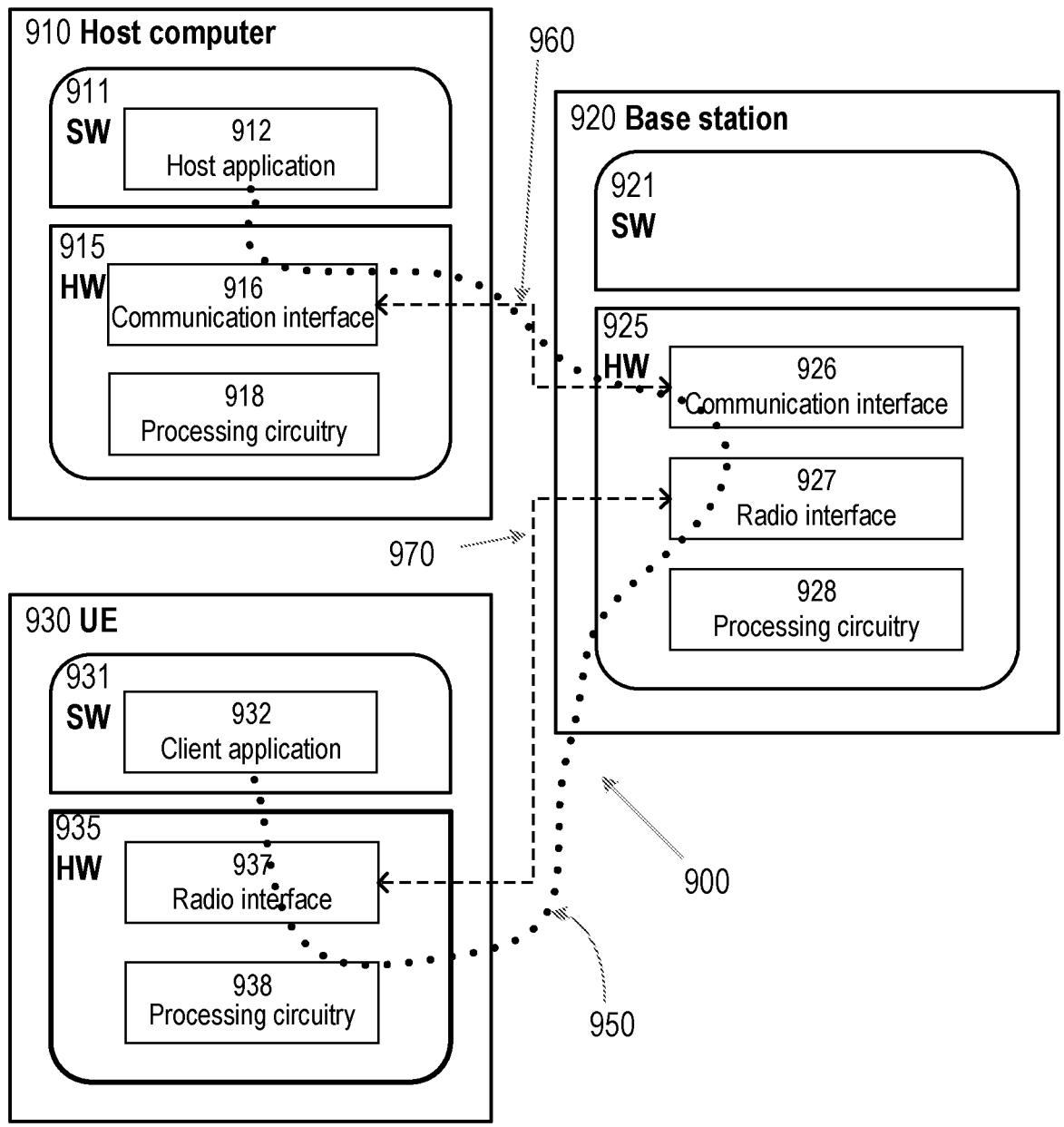
FIG. 9 shows a host computer communicating via a base station with a user equipment over a partially wireless connection in accordance with embodiments of the disclosure.

It is noted that host computer 910, base station 920 and UE 930 illustrated in FIG. 9 may be similar or identical to host computer 830, one of base stations 812a, 812b, 812c and one of UEs 891, 892 of FIG. 8, respectively. This is to say, the inner workings of these entities may be as shown in FIG. 9 and independently, the surrounding network topology may be that of FIG. 8.

In FIG. 9, OTT connection 950 has been drawn abstractly to illustrate the communication between host computer 910 and UE 930 via base station 920, without explicit reference to any intermediary devices and the precise routing of messages via these devices. Network infrastructure may determine the routing, which it may be configured to hide from UE 930 or from the service provider operating host computer 910, or both. While OTT connection 950 is active, the network infrastructure may further take decisions by which it dynamically changes the routing (e.g., on the basis of load balancing consideration or reconfiguration of the network).

Wireless connection 970 between UE 930 and base station 920 is in accordance with the teachings of the embodiments described throughout this disclosure. One or more of the various embodiments improve the performance of OTT services provided to UE 930 using OTT connection 950, in which wireless connection 970 forms the last segment. More precisely, the teachings of these embodiments may improve the quality of service (e.g. via reduced latency and/or increased data rate) and thereby provide benefits such as reduced user waiting time and better responsiveness.

A measurement procedure may be provided for the purpose of monitoring data rate, latency and other factors on which the one or more embodiments improve. There may further be an optional network functionality for reconfiguring OTT connection 950 between host computer 910 and UE 930, in response to variations in the measurement results. The measurement procedure and/or the network functionality for reconfiguring OTT connection 950 may be implemented in software 911 and hardware 915 of host computer 910 or in software 931 and hardware 935 of UE 930, or both. In embodiments, sensors (not shown) may be deployed in or in association with communication devices through which OTT connection 950 passes; the sensors may participate in the measurement procedure by supplying values of the monitored quantities exemplified above, or supplying values of other physical quantities from which software 911, 931 may compute or estimate the monitored quantities. The reconfiguring of OTT connection 950 may include message format, retransmission settings, preferred routing etc.; the reconfiguring need not affect base station 920, and it may be unknown or imperceptible to base station 920. Such procedures and functionalities may be known and practiced in the art. In certain embodiments, measurements may involve proprietary UE signaling facilitating host computer 910's measurements of throughput, propagation times, latency and the like. The measurements may be implemented in that software 911 and 931 causes messages to be transmitted, in particular empty or 'dummy' messages, using OTT connection 950 while it monitors propagation times, errors etc.

Figure 10:
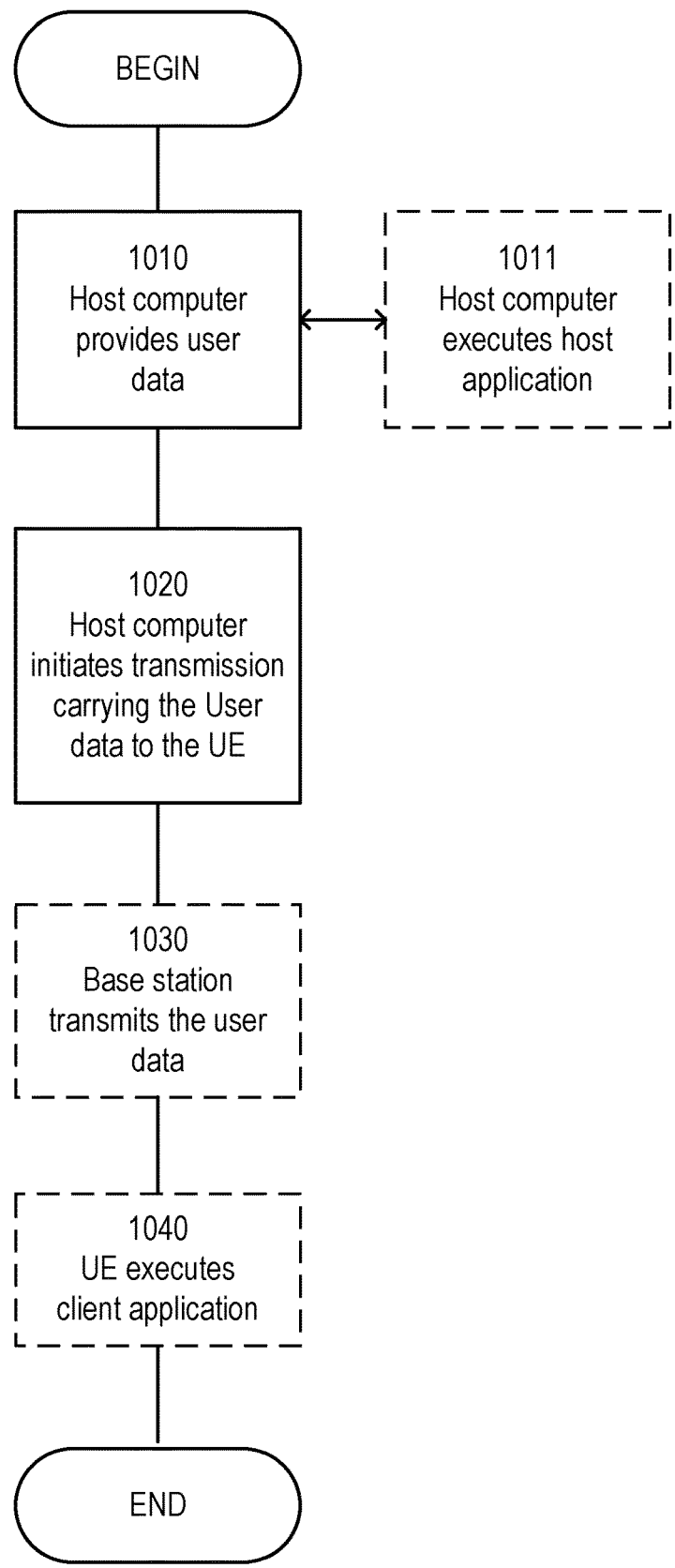
FIGS. 10 to 13 are flowcharts of methods implemented in a communication system including a host computer, a base station and a user equipment according to embodiments of the disclosure.

FIG. 10 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 10 will be included in this section. In step 1010, the host computer provides user data. In substep 1011 (which may be optional) of step 1010, the host computer provides the user data by executing a host application. In step 1020, the host computer initiates a transmission carrying the user data to the UE. In step 1030 (which may be optional), the base station transmits to the UE the user data which was carried in the transmission that the host computer initiated, in accordance with the teachings of the embodiments described throughout this disclosure. In step 1040 (which may also be optional), the UE executes a client application associated with the host application executed by the host computer.

Figure 11:
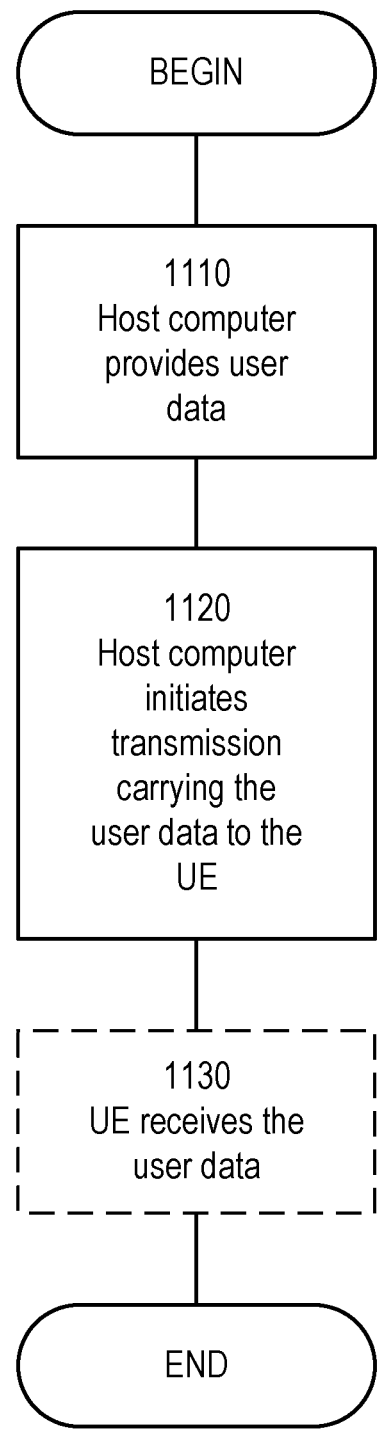

FIG. 11 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 11 will be included in this section. In step 1110 of the method, the host computer provides user data. In an optional substep (not shown) the host computer provides the user data by executing a host application. In step 1120, the host computer initiates a transmission carrying the user data to the UE. The transmission may pass via the base station, in accordance with the teachings of the embodiments described throughout this disclosure. In step 1130 (which may be optional), the UE receives the user data carried in the transmission.

Figure 12:
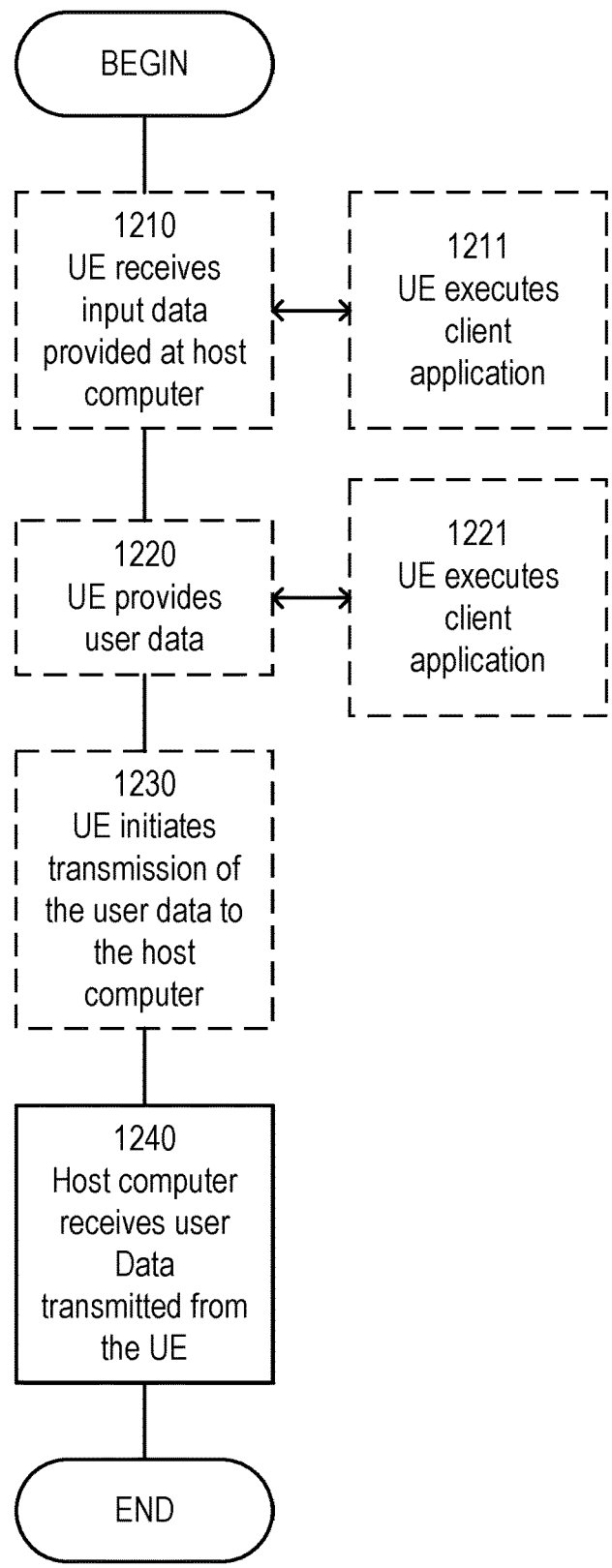

FIG. 12 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 12 will be included in this section. In step 1210 (which may be optional), the UE receives input data provided by the host computer. Additionally or alternatively, in step 1220, the UE provides user data. In substep 1221 (which may be optional) of step 1220, the UE provides the user data by executing a client application. In substep 1211 (which may be optional) of step 1210, the UE executes a client application which provides the user data in reaction to the received input data provided by the host computer. In providing the user data, the executed client application may further consider user input received from the user. Regardless of the specific manner in which the user data was provided, the UE initiates, in substep 1230 (which may be optional), transmission of the user data to the host computer. In step 1240 of the method, the host computer receives the user data transmitted from the UE, in accordance with the teachings of the embodiments described throughout this disclosure.

Figure 13:
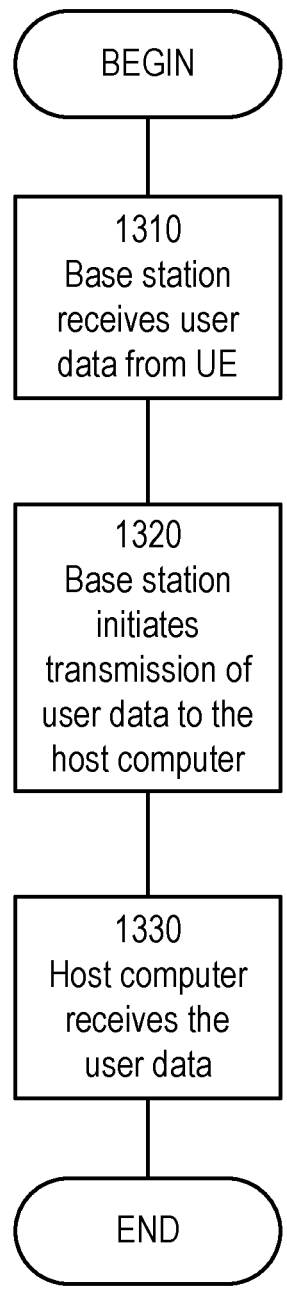

FIG. 13 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 13 will be included in this section. In step 1310 (which may be optional), in accordance with the teachings of the embodiments described throughout this disclosure, the base station receives user data from the UE. In step 1320 (which may be optional), the base station initiates transmission of the received user data to the host computer. In step 1330 (which may be optional), the host computer receives the user data carried in the transmission initiated by the base station.

Figure 14:
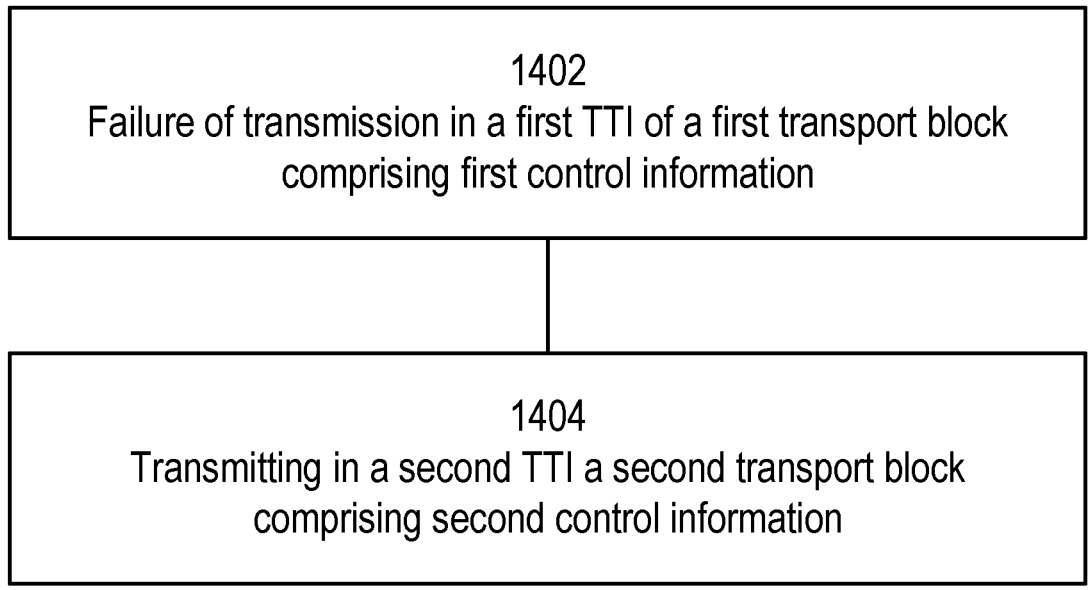
FIG. 14 is a flowchart of a method implemented in a wireless device according to embodiments of the disclosure.

FIG. 14 depicts a method in accordance with particular embodiments, carried out in a wireless device or user equipment (such as the wireless device 510 or the UE 600 described above). The method begins at step 1402, in which the transmission in a first TTI of a first transport block comprising first control information fails. For example, the wireless device may be configured to implement a listen-before-talk (LBT) procedure prior to transmitting, and transmit only in the event that the channel over which the transmission is intended to take place is sufficiently clear (i.e. no other devices are transmitting using the same transmission frequency(ies) and time slots, or the level of interference from other devices is sufficiently low that a transmission can be expected to be successfully received). If the channel is not sufficiently clear (i.e. the channel is busy), transmission of the first transport block may not be attempted.

Alternatively or additionally, transmission of the first transport block in the first TTI may be unsuccessful due to the first transport block being unsuccessfully received at a receiving device (e.g. a network node, such as the nodes Q110 described above). In that event, the receiving device may transmit a negative acknowledgement message (NACK) to the wireless device identifying a HARQ identity of a HARQ process associated with the first transport block. Alternatively, if no acknowledgement message in respect of the first transport block is received from the receiving device (e.g. within a time window defined for reception of such an acknowledgement message), the wireless device may similarly determine that the first transport block was not successfully received by the receiving device and the transmission of the first transport block may again be determined as unsuccessful.

In step 1404, responsive to failure of transmission of the first transport block in step 1402, the wireless device generates and/or transmits a new transport block (i.e. a second transport block) containing updated, second control information for transmission in a second, subsequent TTI and reflecting the status at the second TTI. The second control information may comprise an updated version of the first control information. Thus, where the first control information comprises a MAC CE (e.g. BSR/PHR content), for example, the second control information may comprise an updated version of the MAC CE with updated information. The updated information may comprise new values, or indications of new values, for one or more control fields recited in the first control information.

Figure 15:
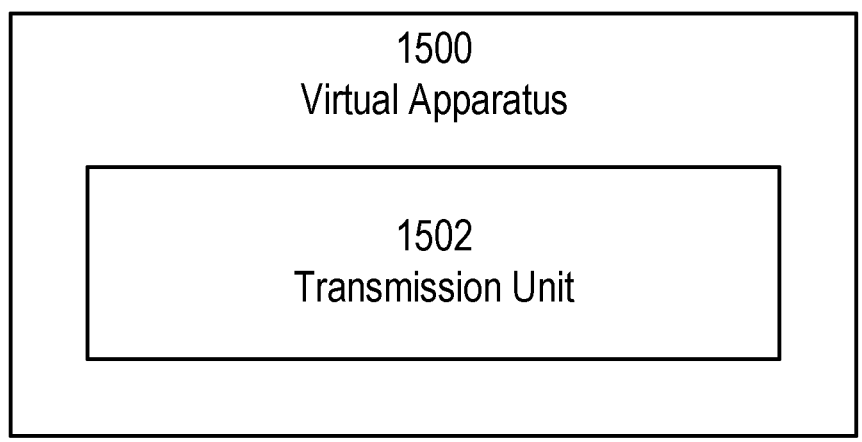
FIG. 15 is a schematic drawing of a virtualization apparatus according to embodiments of the disclosure.

FIG. 15 illustrates a schematic block diagram of an apparatus 1500 in a wireless network (for example, the wireless network shown in FIG. 5). The apparatus may be implemented in a wireless device (e.g., wireless device 510 or UE 600 shown in FIGS. 5 and 6). Apparatus 1500 is operable to carry out the example method described with reference to FIG. 14 and possibly any other processes or methods disclosed herein. It is also to be understood that the method of FIG. 14 is not necessarily carried out solely by apparatus 1500. At least some operations of the method can be performed by one or more other entities.

Virtual Apparatus 1500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause transmission unit 1502 and any other suitable units of apparatus 1500 to perform corresponding functions according one or more embodiments of the present disclosure.

As illustrated in FIG. 15, apparatus 1500 includes a transmission unit 1502. Transmission unit 1502 is configured to, responsive to failure of transmission in a first transmission time interval of a first transport block comprising first control information, transmit in a second, subsequent transmission time interval a second transport block comprising second control information. The second control information is an updated version of the first control information.

Figure 16:
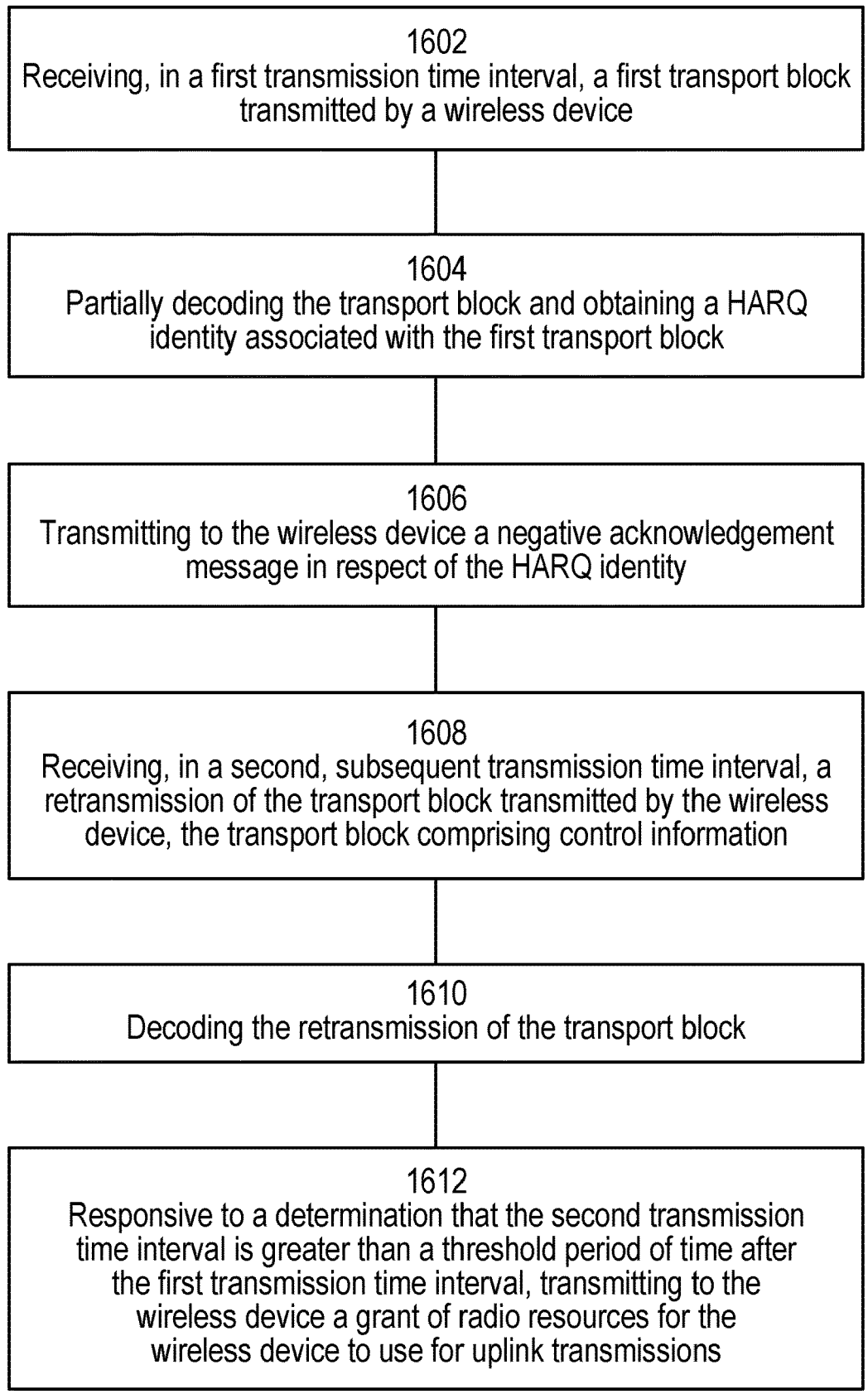
FIG. 16 is a flowchart of a method implemented in a base station according to embodiments of the disclosure.

FIG. 16 depicts a method in accordance with particular embodiments, carried out in a network node (such as the network node 560 described above). The method begins at step 1602, in which the network node receives, in a first transmission time interval, a first transport block transmitted by a wireless device. In step 1604, the network node partially decodes the transport block and obtains a HARQ identity associated with the transport block. For example, the first transport block may only be partially received in step 1602, such that the HARQ identity can be obtained or decoded, but the first transport block cannot be completely decoded. In step 1606, the network node transmits to the wireless device a negative acknowledgement message (e.g. NACK) in respect of the obtained HARQ identity. In step 1608, the network node receives, in a second, subsequent transmission time interval, a retransmission of the first transport block transmitted by the wireless device. The first transport block comprises control information. In step 1610, the network node decodes the retransmission of the first transport block. In step 1612, responsive to a determination (e.g. by the network node) that the second transmission time interval is greater than a threshold period of time after the first transmission time interval, the network node transmits to the wireless device a grant of radio resources for the wireless device to use for uplink transmissions.

According to further embodiments, the grant of radio resources is configured to trigger the transmission of further control information by the wireless device.

In further embodiments, the control information comprises a buffer status report, and the granted resources comprise an amount of resources required to transmit an amount of data reported in the buffer status report, and an additional amount of resources.

Figure 17:
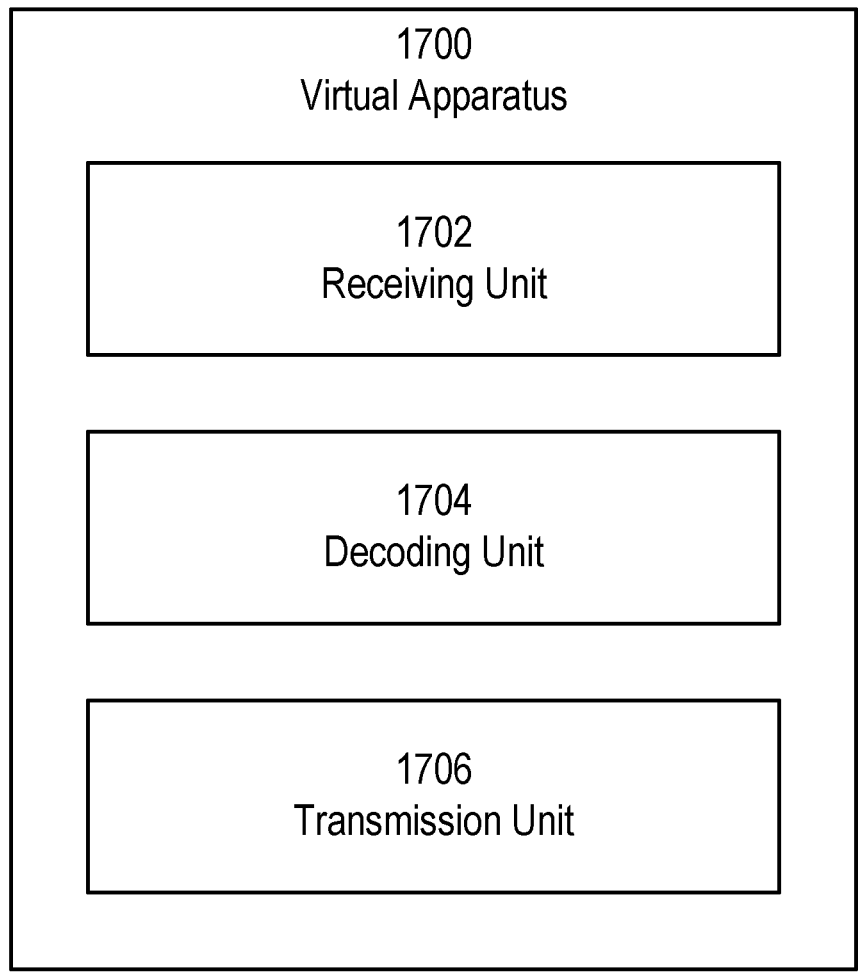
FIG. 17 is a schematic drawing of a virtualization apparatus according to embodiments of the disclosure.

FIG. 17 illustrates a schematic block diagram of an apparatus 1700 in a wireless network (for example, the wireless network shown in FIG. 5). The apparatus may be implemented in a network node (e.g., network node 560 shown in FIG. 5). Apparatus 1700 is operable to carry out the example method described with reference to FIG. 16 and possibly any other processes or methods disclosed herein. It is also to be understood that the method of FIG. 16 is not necessarily carried out solely by apparatus 1700. At least some operations of the method can be performed by one or more other entities.

Virtual Apparatus 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1702, decoding unit 1704 and transmission unit 1706 and any other suitable units of apparatus 1700 to perform corresponding functions according one or more embodiments of the present disclosure.

As illustrated in FIG. 17, apparatus 1700 includes a receiving unit 1702, a decoding unit 1704 and a transmission unit 1706. Receiving unit 1702 is configured to receive, in a first transmission time interval, a first transport block transmitted by a wireless device operable in the wireless communications network. Decoding unit 1704 is configured to partially decode the transport block and obtain a HARQ identity associated with the first transport block. Transmission unit 1706 is configured to transmit to the wireless device a negative acknowledgement message in respect of the HARQ identity. Receiving unit 1702 is further configured to receive, in a second, subsequent transmission time interval, a retransmission of the transport block transmitted by the wireless device, the transport block comprising control information. Decoding unit 1704 is further configured to decode the retransmission of the transport block. Transmission unit 1706 is further configured to, responsive to a determination that the second transmission time interval is greater than a threshold period of time after the first transmission time interval, transmit to the wireless device a grant of radio resources for the wireless device to use for uplink transmissions.

According to further embodiments, the grant of radio resources is configured to trigger the transmission of further control information by the wireless device.

In further embodiments, the control information comprises a buffer status report, and the granted resources comprise an amount of resources required to transmit an amount of data reported in the buffer status report, and an additional amount of resources.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Abbreviations

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1×Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network The following numbered paragraphs set out embodiments of the disclosure.

GROUP A EMBODIMENTS

1. A method performed by a wireless device operable in a wireless communications network, the method comprising:
responsive to failure of transmission in a first transmission time interval of a first transport block comprising first control information, transmitting in a second, subsequent transmission time interval a second transport block comprising second control information, wherein the second control information is an updated version of the first control information.
2. The method of embodiment 1, wherein failure of transmission of the first transport block comprises the wireless device determining that a wireless channel over which the first transport block is to be transmitted is busy in the first transmission time interval.
3. The method of embodiment 1 or 2, wherein failure of transmission of the first transport block comprises the wireless device receiving a negative acknowledgement message, or receiving no acknowledgement message, in respect of the first transport block from a network node operable in the wireless communications network.
4. The method of any preceding embodiment, comprising transmitting the second transport block responsive further to a determination that the second transmission time interval is greater than a threshold period of time after the first transmission time interval.
5. The method of embodiment 4, comprising transmitting a third transport block comprising the first control information responsive to a determination that the second transmission time interval is less than the threshold period of time after the first transmission time interval.
6. The method of embodiment 4 or 5, wherein the threshold period of time varies as a function of the type of control information comprised within the first control information.
7. The method of embodiment 6, wherein the threshold period of time varies as a function of a logical channel or a logical channel group to which the control information comprised within the first control information belongs.
8. The method of embodiment 7, wherein the threshold period of time varies such that the threshold period of time is a first value for control information belonging to a first logical channel or a first logical channel group being associated with a first priority, and the threshold period of time is a second value for control information belonging to a second logical channel or a second logical channel group being associated with a second priority, wherein the first priority is higher than the second priority, and wherein the first value is less than the second value.
9. The method of any preceding embodiment, comprising transmitting the second transport block responsive further to a determination that the first control information has changed by an amount greater than a threshold amount since the first transmission time interval.
10. The method of embodiment 9, wherein the threshold amount is zero or a finite amount.
11. The method of any preceding embodiment, further comprising generating the second transport block.
12. The method of embodiment 11, wherein generating the second transport block comprises cancelling the first transport block and preparing a new transport block.
13. The method of embodiment 11, wherein generating the second transport block comprises updating the first transport block.
14. The method of any one of embodiments 11 to 13, wherein the generation of the second transport block is initiated prior to a determination that transmission of the first transport block failed.
15. The method of any one of embodiments 11 to 14, comprising, responsive to a determination during generation of the second transport block that a wireless channel over which the first transport block was to be transmitted is available, re-transmitting the first transport block.
16. The method of any one of embodiments 11 to 14, comprising, responsive to a determination during generation of the second transport block that a wireless channel over which the first transport block was to be transmitted is available, awaiting completion of the generation of the second transport block and transmitting the second transport block in the second transmission time interval.
17. The method of any preceding embodiment, comprising transmitting the second transport block further responsive to a determination that no prior transmission of the first control information has taken place.
18. The method of any preceding embodiment, comprising transmitting the second transport block further responsive to a determination that the wireless device is semi-persistently scheduled radio resources in which to transmit the first transport block.
19. The method of any preceding embodiment, wherein the first control information comprises a control element.
20. The method of embodiment 19, wherein the control element comprises one of: buffer status report (UL or SL); a power headroom report; and semi-persistent scheduling confirmation.
21. The method of any preceding embodiment, wherein the first control information comprises RRC control information.
22. The method of any preceding embodiment, wherein transmissions by the wireless device utilize unlicensed spectrum.
23. The method of any of the previous embodiments, further comprising:
providing user data;
receiving, from a base station operable in the wireless communications network, a grant of UL radio resources based on the control information; and
forwarding the user data to a host computer via a transmission to the base station utilizing the granted UL radio resources.

GROUP B EMBODIMENTS

24. A method performed by a base station operable in a wireless communications network, the method comprising:

receiving, in a first transmission time interval, a first transport block transmitted by a wireless device operable in the wireless communications network;
partially decoding the transport block and obtaining a HARQ identity associated with the transport block;
transmitting to the wireless device a negative acknowledgement message in respect of the HARQ identity;
receiving, in a second, subsequent transmission time interval, a retransmission of the transport block transmitted by the wireless device, the transport block comprising control information;
decoding the retransmission of the transport block; and
responsive to a determination that the second transmission time interval is greater than a threshold period of time after the first transmission time interval, transmitting to the wireless device a grant of radio resources for the wireless device to use for uplink transmissions.

25. The method of embodiment 24, wherein the grant of radio resources is configured to trigger the transmission of further control information by the wireless device.

26. The method of embodiment 24, wherein the control information comprises a buffer status report, and wherein the granted resources comprise an amount of resources required to transmit an amount of data reported in the buffer status report, and an additional amount of resources.

27. The method of embodiment 26, wherein the additional amount varies as a function of the length of time between the first and second transmission time intervals.

28. The method of any one of embodiments 24 to 27, wherein transmissions between the wireless device and the base station utilize unlicensed spectrum.

29. The method of any one of embodiments 24 to 28, further comprising:
obtaining user data; and
forwarding the user data to a host computer or a wireless device.

GROUP C EMBODIMENTS

30. A wireless device operable in a wireless communications network, the wireless device comprising:
processing circuitry configured to perform any of the steps of any of the Group A embodiments; and
power supply circuitry configured to supply power to the wireless device.

31. A base station operable in a wireless communications network, the base station comprising:
processing circuitry configured to perform any of the steps of any of the Group B embodiments;
power supply circuitry configured to supply power to the base station.

32. A user equipment (UE) operable in a wireless communications network, the UE comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

33. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of the Group B embodiments.

34. The communication system of the previous embodiment further including the base station.

35. The communication system of the previous 2 embodiments, further including the UE, wherein the UE is configured to communicate with the base station.

36. The communication system of the previous 3 embodiments, wherein:
the processing circuitry of the host computer is configured to execute a host application, thereby providing the user data; and
the UE comprises processing circuitry configured to execute a client application associated with the host application.

37. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of the Group B embodiments.

38. The method of the previous embodiment, further comprising, at the base station, transmitting the user data.

39. The method of the previous 2 embodiments, wherein the user data is provided at the host computer by executing a host application, the method further comprising, at the UE, executing a client application associated with the host application.

40. A user equipment (UE) configured to communicate with a base station, the UE comprising a radio interface and processing circuitry configured to performs the of the previous 3 embodiments.

41. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of the Group A embodiments.

42. The communication system of the previous embodiment, wherein the cellular network further includes a base station configured to communicate with the UE.

43. The communication system of the previous 2 embodiments, wherein:
the processing circuitry of the host computer is configured to execute a host application, thereby providing the user data; and the UE's processing circuitry is configured to execute a client application associated with the host application.

44. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the UE performs any of the steps of any of the Group A embodiments.

45. The method of the previous embodiment, further comprising at the UE, receiving the user data from the base station.

46. A communication system including a host computer comprising:
   communication interface configured to receive user data originating from a transmission from a user equipment (UE) to a base station,
   wherein the UE comprises a radio interface and processing circuitry, the UE's processing circuitry configured to perform any of the steps of any of the Group A embodiments.

47. The communication system of the previous embodiment, further including the UE.

48. The communication system of the previous 2 embodiments, further including the base station, wherein the base station comprises a radio interface configured to communicate with the UE and a communication interface configured to forward to the host computer the user data carried by a transmission from the UE to the base station.

49. The communication system of the previous 3 embodiments, wherein:
   the processing circuitry of the host computer is configured to execute a host application; and
   the UE's processing circuitry is configured to execute a client application associated with the host application, thereby providing the user data.

50. The communication system of the previous 4 embodiments, wherein:
   the processing circuitry of the host computer is configured to execute a host application, thereby providing request data; and
   the UE's processing circuitry is configured to execute a client application associated with the host application, thereby providing the user data in response to the request data.

51. A method implemented in a communication system including a host computer, a base station and a user equipment (UE), the method comprising:
   at the host computer, receiving user data transmitted to the base station from the UE, wherein the UE performs any of the steps of any of the Group A embodiments.

52. The method of the previous embodiment, further comprising, at the UE, providing the user data to the base station.

53. The method of the previous 2 embodiments, further comprising:
   at the UE, executing a client application, thereby providing the user data to be transmitted; and
   at the host computer, executing a host application associated with the client application.

54. The method of the previous 3 embodiments, further comprising:
   at the UE, executing a client application; and
   at the UE, receiving input data to the client application, the input data being provided at the host computer by executing a host application associated with the client application,
   wherein the user data to be transmitted is provided by the client application in response to the input data.

55. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

56. The communication system of the previous embodiment further including the base station.

57. The communication system of the previous 2 embodiments, further including the UE, wherein the UE is configured to communicate with the base station.

58. The communication system of the previous 3 embodiments, wherein:
   the processing circuitry of the host computer is configured to execute a host application;
   the UE is configured to execute a client application associated with the host application, thereby providing the user data to be received by the host computer.

59. A method implemented in a communication system including a host computer, a base station and a user equipment (UE), the method comprising:
   at the host computer, receiving, from the base station, user data originating from a transmission which the base station has received from the UE, wherein the UE performs any of the steps of any of the Group A embodiments.

60. The method of the previous embodiment, further comprising at the base station, receiving the user data from the UE.

61. The method of the previous 2 embodiments, further comprising at the base station, initiating a transmission of the received user data to the host computer.

The invention claimed is:

1. A method performed by a wireless device operable in a wireless communications network, the method comprising:
   generating control information for transmission over a wireless channel using first uplink transmission resources; and
   responsive to determining that the wireless channel is busy with respect to transmitting on the first uplink transmission resources, attempting to transmit the control information on subsequent second uplink transmission resources, if an elapsed time to the second uplink transmission resources is below a threshold, and otherwise attempting to transmit updated control information on the second uplink transmission resources.

2. The method of claim 1, wherein the first uplink transmission resources comprise an instance of periodic transmission resources granted to the wireless device via a semi-persistent scheduled (SPS) grant, and the second uplink transmission resources comprise a next instance of the periodic transmission resources.

3. The method of claim 1, wherein the control information comprises a Medium Access Control (MAC) Control Element (CE) or Radio Resource Control (RRC) signaling, and wherein the updated control information includes or indicates one or more updated values in the MAC CE or RRC signaling, to account for changes occurring after the generation of the control information.

4. A wireless device operable in a wireless communications network, the wireless device comprising:
  processing circuitry configured to:
    generate control information for transmission over a wireless channel using first uplink transmission resources; and
    responsive to determining that the wireless channel is busy with respect to transmitting on the first uplink transmission resources, attempt to transmit the control information on subsequent second uplink transmission resources, if an elapsed time to the second uplink transmission resources is below a threshold, and otherwise attempt to transmit updated control information on the second uplink transmission resources; and
  power supply circuitry configured to supply power to the wireless device.

5. The wireless device of claim 4, wherein the first uplink transmission resources comprise an instance of periodic transmission resources granted to the wireless device via a semi-persistent scheduled (SPS) grant, and the second uplink transmission resources comprise a next instance of the periodic transmission resources.

6. The wireless device of claim 4, wherein the control information comprises a Medium Access Control (MAC) Control Element (CE) or Radio Resource Control (RRC) signaling, and wherein the updated control information includes or indicates one or more updated values in the MAC CE or RRC signaling, to account for changes occurring after generation of the control information.

* * * * *